United States Patent [19]
Childress et al.

[11] Patent Number: 5,369,783
[45] Date of Patent: Nov. 29, 1994

[54] DYNAMIC REGROUPING IN A TRUNKED RADIO COMMUNICATIONS SYSTEMS

[75] Inventors: Jeffrey S. Childress; David L. Hattey, both of Lynchburg, Va.

[73] Assignee: Ericsson GE Mobile Communications Inc., Lynchburg, Va.

[21] Appl. No.: 135,582

[22] Filed: Oct. 13, 1993

Related U.S. Application Data

[63] Continuation of Ser. No. 585,791, Sep. 20, 1990, abandoned, which is a continuation of Ser. No. 229,814, Aug. 8, 1988, Pat. No. 5,117,501.

[51] Int. Cl.$^5$ .............................................. H04B 7/15
[52] U.S. Cl. ................................. 455/17; 455/34.1; 455/34.2; 455/56.1; 455/68
[58] Field of Search ................ 455/11.1, 12.1, 17, 455/33.1, 33.4, 34.1, 34.2, 38.1, 51.1, 54.1, 54.2, 56.1, 68; 379/57-60, 63; 340/825.01, 825.05, 825.44, 825.52; 375/107-108, 114; 370/95.1, 110.1

[56] References Cited

U.S. PATENT DOCUMENTS 3,292,178 12/1966 Magnuski .
3,458,664 7/1969 Adlhoch et al. .
3,571,519 3/1971 Tsimbidis .

(List continued on next page.)

FOREIGN PATENT DOCUMENTS 61-102836(A) 5/1986 Japan .
987293 3/1965 United Kingdom .
1571269 7/1980 United Kingdom .
1573795 8/1980 United Kingdom .
2118340 10/1983 United Kingdom .
WO8701537 3/1987 WIPO .

OTHER PUBLICATIONS

Federal Information Processing Standards, Pub. No. 46, Data Encryption Standard, US Dept. of Comm, NTIS, (5285 Port Royal Rd., Springfield, Va. 22161).
"Voice and Data Transmission", Arrendondo, Teggeler and Smith, Bell Systems Technology Journal, vol. 58, No. 1, Jan. 1978, pp. 97–122.
"AmeriCom's Network Switch", product brochure, Jan. 26, 1988, AmeriCom Corporation, Atlanta, Ga. 30340.
"AmeriCom's Network Supervisor", product brochures, Jan. 26, 1988, AmeriCom Corporation, Atlanta, Ga. 30340.
"Motorola Announces the Syntor X 9000E Mobile Radio for SMARTNET Systems"; Motorola, Inc., Shaumburg, Ill. 60196; press release of 6 Aug. 1987.
"Motorola Introduces SMARTNET MOSTAR Mobile Radio for Trunked and Conventional 800 MHz Systems", press release of 27 Jun. 1986.

(List continued on next page.)

Primary Examiner—Reinhard J. Eisenzopf
Assistant Examiner—Andrew Faile
Attorney, Agent, or Firm—Nixon & Vanderhye

[57] ABSTRACT

In a trunked radio frequency communications system, a dynamic regrouping scheme includes an effective user interface, automatic support of multi-site systems, the capability to program individual radio transceivers with multiple new groups dynamically, a fast rate of reconfiguration, instantaneous switch over to prevent radios from residing in immature groups, and a satisfactory mode of operation should the site controller (or site controllers in non-fault tolerant systems) fail. Some of the dynamic regrouping features includes unlimited prestored plans and source and destination groups per plan, regrouping at the plan or destination group level, an advanced user interface, automatic support of multiple sites, fast regrouping at the rate of over 30 radios per second while reducing loading on the system control channel, and fast activation/deactivation. Each plan can be immediately activated or deactivated and users are effectively regrouped together. An alternate control channel is used to regroup transceivers to avoid undue main control channel loading and to increase rate of regrouping.

19 Claims, 12 Drawing Sheets

U.S. PATENT DOCUMENTS

| | | |
|---|---|---|
| 3,696,210 | 10/1972 | Peterson et al. . |
| 3,764,915 | 10/1973 | Cox et al. ............................... 455/33 |
| 3,801,956 | 4/1974 | Braun et al. . |
| 3,898,390 | 8/1975 | Wells et al. . |
| 3,906,166 | 9/1975 | Cooper et al. . |
| 3,936,616 | 2/1976 | DiGianfilippo . |
| 3,964,047 | 6/1976 | Antonaccio . |
| 3,970,801 | 7/1976 | Ross et al. . |
| 4,001,693 | 1/1977 | Stackhouse et al. . |
| 4,010,327 | 3/1977 | Kobrinetz et al. . |
| 4,012,597 | 3/1977 | Lynk, Jr. et al. . |
| 4,022,973 | 5/1977 | Stackhouse . |
| 4,027,243 | 5/1977 | Stackhouse . |
| 4,029,901 | 6/1977 | Campbell . |
| 4,128,740 | 12/1978 | Graziano . |
| 4,131,849 | 12/1978 | Freeburg et al. . |
| 4,152,647 | 5/1979 | Gladden et al. . |
| 4,184,118 | 1/1980 | Cannalte et al. . |
| 4,228,424 | 10/1980 | Le Nay . |
| 4,230,989 | 10/1980 | Buehrle . |
| 4,231,114 | 10/1980 | Dolikian . |
| 4,267,593 | 5/1981 | Craiglow . |
| 4,309,772 | 1/1982 | Kloker et al. . |
| 4,312,070 | 1/1982 | Coombes et al. . |
| 4,312,074 | 1/1982 | Pautler et al. . |
| 4,322,576 | 3/1982 | Miller . |
| 4,326,264 | 4/1982 | Cohen et al. . |
| 4,339,823 | 7/1982 | Predina et al. . |
| 4,347,625 | 8/1982 | Williams . |
| 4,360,927 | 11/1982 | Bowen et al. . |
| 4,369,443 | 1/1983 | Giallanza et al. . |
| 4,382,298 | 5/1983 | Evans . |
| 4,383,257 | 5/1983 | Gialanza et al. . |
| 4,392,242 | 7/1983 | Kai . |
| 4,398,063 | 8/1983 | Hass et al. . |
| 4,400,585 | 8/1983 | Kamen et al. . |
| 4,409,687 | 10/1983 | Berti et al. . |
| 4,414,661 | 11/1983 | Karlstrom . |
| 4,418,425 | 11/1983 | Fennel, Jr. et al. . |
| 4,422,071 | 12/1983 | deGraaf . |
| 4,427,980 | 1/1984 | Fennel et al. . |
| 4,430,742 | 2/1984 | Milleker et al. . |
| 4,430,755 | 2/1984 | Nadir et al. . |
| 4,433,256 | 2/1984 | Dolikian . |
| 4,434,323 | 2/1984 | Levine et al. . |
| 4,450,573 | 5/1984 | Noble . |
| 4,457,018 | 6/1984 | Takayama ............................... 455/33 |
| 4,485,486 | 11/1984 | Webb et al. . |
| 4,517,561 | 5/1985 | Burke et al. . |
| 4,525,865 | 6/1985 | Mears ............................... 455/186 |
| 4,534,061 | 8/1985 | Ulug . |
| 4,553,262 | 11/1985 | Coe . |
| 4,573,206 | 2/1986 | Gravel et al. ............................... 455/33 |
| 4,573,209 | 2/1986 | Deman et al. ............................... 455/73 |
| 4,578,815 | 3/1986 | Persinotti . |
| 4,593,155 | 6/1986 | Hawkins . |
| 4,594,591 | 6/1986 | Burke . |
| 4,602,366 | 7/1986 | Takumi . |
| 4,612,415 | 9/1986 | Zdunek et al. . |
| 4,644,347 | 2/1987 | Lucas et al. ............................... 340/825.04 |
| 4,649,567 | 3/1987 | Childress . |
| 4,658,435 | 4/1987 | Childress et al. . |
| 4,677,653 | 6/1987 | Weiner et al. ............................... 379/58 |
| 4,682,367 | 7/1987 | Childress et al. ............................... 455/17 |
| 4,698,805 | 10/1987 | Sasuta et al. . |
| 4,716,407 | 12/1987 | Borras et al. . |
| 4,723,266 | 2/1988 | Perry ............................... 379/60 |
| 4,734,928 | 3/1988 | Weiner et al. ............................... 379/59 |
| 4,771,399 | 9/1988 | Snowden et al. . |
| 4,817,190 | 3/1989 | Comroe et al. ............................... 455/11 |
| 4,831,373 | 5/1989 | Hess ............................... 455/17 |
| 4,837,858 | 6/1989 | Ablay et al. ............................... 455/34 |
| 4,843,588 | 6/1989 | Flynn ............................... 364/900 |
| 4,850,032 | 7/1989 | Freeburg . |
| 4,870,408 | 9/1989 | Zdunek et al. ............................... 370/95.1 |
| 5,014,345 | 5/1991 | Comroe et al. . |
| 5,117,501 | 5/1992 | Childress et al. ............................... 455/11.1 |

OTHER PUBLICATIONS

Product Digest RO-8-37, Aug. 1987 by Motorola, "SMARTNET Trunking Terminals System", 30 pages.

Motorola publication, Jan. 1986 "Basic Trunking Privacy-Plus Smartnet Wide Area Coverage," Section D, Dynamic Regrouping, 4 pages.

FIG. 5

| | 1404 | 1406 | 1408 | 1410 | 1412 |
|---|---|---|---|---|---|
| 1402(0) | Logical ID | Home Group ID | Pointer | Status | Unit Control B. |
| 1402(1) | | | | | |
| 1402(2) | | | | | |
| 1402(3) | | | | | |
| 1402(4) | | | | | |
| ~ | | | | | ~ |
| 1402(n) | | | | | |

| | 1424 | 1420 / 1426 | 1428 | 1430 | 1432 | 1434 | 1436 |
|---|---|---|---|---|---|---|---|
| 1422(0) | Destination GID | First LID Ptr | Last LID Ptr | Elements Avail. | Retry | Count | Status |
| 1422(1) | | | | | | | |
| 1422(2) | | | | | | | |
| 1422(3) | | | | | | | |
| 1422(4) | | | | | | | |
| ~ | | | | ~ | | | |
| 1422(n) | | | | | | | |

FIG. 7

STATUS BLOCK

| | 1436(a) | 1436(b) |
|---|---|---|
| U N U S E D | Active | Fleet Decode Field |

1436

DYNAMIC REGROUPING IN A TRUNKED RADIO COMMUNICATIONS SYSTEMS

This application is a continuation of Ser. No. 07/585,791 filed Sep. 20, 1990, now abandoned, which is a continuation of Ser. No. 07/229,814 filed Aug. 8, 1988 now U.S. Pat. No. 5,117,501.

CROSS-REFERENCES TO RELATED APPLICATIONS

This application is related to commonly assigned U.S. patent application Ser. No. 085,663 filed on Aug. 14, 1987 entitled "Radio Trunking Fault Detection System". This application is also related to the following commonly-assigned U.S. patent applications all filed on Jun. 3, 1987: application Ser. No. 056,922 of Childress et al entitled "Trunked Radio Repeater System"; application Ser. No. 057,046 of Childress et al entitled "Failsoft Architecture for Public Trunking System"; application Ser. No. 056,924 of Childress entitled "Adaptive Limiter/Detector Which Changes Time Constant Upon Detection of Dotting Pattern"; application Ser. No. 056,923 of Childress et al entitled "Apparatus and Method for Transmitting Digital Data Over a Radio Communications Channel". This application is also related to the following commonly-assigned copending applications filed on Aug. 14, 1987: application Ser. No. 085,572 of Nazarenko et al entitled "Processor-to-Processor Communications Protocol for a Public Service Trunking System"; application Ser. No. 085,490 of Dissosway et al entitled "Mobile Radio Interface"; and application Ser. No. 085,491 of Cole et al entitled "A Method for Infrequent Radio Users to Simply Obtain Emergency Assistance". This application is also related to U.S. application Ser. No. 181,441 filed Oct. 7, 1987, 1988 entitled "Signalling Protocol for a Trunked Radio Repeater System". The disclosures of each of those related copending patent applications are incorporated by reference herein.

FIELD OF THE INVENTION

This invention is generally directed to the art of trunked radio repeater systems. It is more particularly directed to a trunked radio repeater system arrangement and method which permits individual and groups of mobile radio units to be dynamically regrouped to allow communications between units which cannot normally communicate with one another.

BACKGROUND AND SUMMARY OF THE INVENTION

Radio repeater trunking (time sharing of a single repeater communications channel among many users) is well-known. Early trunking systems used analog control signals while some more recent systems have utilized digital control signals. Control signals have been utilized on a dedicated control channel and/or on different ones of the working channels for various different reasons and effects. A non-exhaustive but somewhat representative sampling of publications and patents describing typical prior art trunked radio repeater systems is identified below:

U.S. Pat. No. 3,898,390, Wells et al (1975)
U.S. Pat. No. 4,392,242, Kai (1983)
U.S. Pat. No. 4,534,061, Ulug (1985)
U.S. Pat. No. 4,649,567, Childress (1987)
U.S. Pat. No. 4,658,435, Childress et al (1987)
U.S. Pat. No. 4,716,407, Borras et al (1987) JAPAN 61-102836 (A) Ishikawa (May 1986)
U.S. Pat. No. 3,292,178, Magnuski (1966)
U.S. Pat. No. 3,458,664, Adlhoch et al (1969)
U.S. Pat. No. 3,571,519, Tsimbidis (1971)
U.S. Pat. No. 3,696,210, Peterson et al (1972)
U.S. Pat. No. 3,906,166, Cooper et al (1975)
U.S. Pat. No. 3,936,616, DiGianfilippo (1976)
U.S. Pat. No. 3,970,801, Ross et al (1976)
U.S. Pat. No. 4,001,693, Stackhouse et al (1977)
U.S. Pat. No. 4,010,327, Kobrinetz et al (1977)
U.S. Pat. No. 4,012,597, Lynk, Jr. et al (1977)
U.S. Pat. No. 4,022,973, Stackhouse et al (1977)
U.S. Pat. No. 4,027,243, Stackhouse et al (1977)
U.S. Pat. No. 4,029,901, Campbell (1977)
U.S. Pat. No. 4,128,740, Graziano (1978)
U.S. Pat. No. 4,131,849, Freeburg et al (1978)
U.S. Pat. No. 4,184,118, Cannalte et al (1980)
U.S. Pat. No. 4,231,114, Dolikian (1980)
U.S. Pat. No. 4,309,772, Kloker et al (1982)
U.S. Pat. No. 4,312,070, Coombes et al (1982)
U.S. Pat. No. 4,312,074, Pautler et al (1982)
U.S. Pat. No. 4,326,264, Cohen et al (1982)
U.S. Pat. No. 4,339,823, Predina et al (1982)
U.S. Pat. No. 4,347,625, Williams (1982)
U.S. Pat. No. 4,360,927, Bowen et al (1982)
U.S. Pat. No. 4,400,585, Kamen et al (1982)
U.S. Pat. No. 4,409,687, Berti et al (1983)
U.S. Pat. No. 4,430,742, Milleker et al (1984)
U.S. Pat. No. 4,430,755, Nadir et al (1984)
U.S. Pat. No. 4,433,256, Dolikian (1984)
U.S. Pat. No. 4,450,573, Noble (1984)
U.S. Pat. No. 4,485,486, Webb et al (1984)
U.S. Pat. No. 4,578,815, Persinotti (1985)

There are many actual and potential applications for trunked radio repeater systems. However, one of the more important applications is for public service trunked (PST) systems. For example, one metropolitan area may advantageously use a single system of trunked radio repeaters to provide efficient radio communications between individual radio units within many different agencies. As is well-known to those familiar with trunking theory, a relatively small number of radio repeaters can efficiently service all of needs of a public service organization within a given geographic area if they are trunked (i.e., shared on an "as-needed" basis between all potential units).

Before modern trunked radio repeater systems were developed, mobile radio transceivers were provided with crystal controlled frequency synthesizers providing a limited number of fixed transmit/receive channels—and the various channels were assigned for use by different "groups" of radio transceivers. Referring to FIG. 1, for example, fixed channels might be assigned as follows:

channel A to police squad A,
channel B to police squad B,
channel C to rescue squad/paramedics,
channel D to snow removal equipment,
channel E to municipal vehicles,
channel F to fire squad A, and
channel G to fire squad B.

Every mobile transceiver in a group was typically capable of communicating with other members of its group (and with a central dispatcher) over its assigned communications channel. In addition, several additional channels were typically provided for "cross-group" communications. For example, an additional channel H might be used to permit members of police squad A and police squad B to communicate with one another—while still permitting squad A to use its privately and exclusively assigned channel A to communicate with other members of squad A without disturbing members of squad B. Similarly, an additional channel I might be provided for communications between fire squads A and B and the rescue squad; and a further channel J might be provided for communications between members of police squad A and/or B, the rescue squad, and members of one or both fire squads.

This type of arrangement, although certainly providing private and reliable communications, had some severe disadvantages. One disadvantage was that the "cross-group" channels were usually under-utilized (since most routine communications take place within a group), but often became extremely congested during disasters or emergencies requiring coordination between members of different groups. Moreover, "cross-group" communications typically required some degree of advanced cooperation on the part of each and every member involved (e.g., each user had to properly switch his transceiver to the "cross-group" channel or be sure his "scanning" type transceiver was enabled to monitor that "cross-group" channel). Suppose, for example, that a police officer in police squad A wished to communicate with a rescue vehicle in the rescue squad. The police officer could switch his transceiver to communications channel J and call the rescue vehicle he wished to communicate with—but there was no guarantee that the specific rescue vehicle he was trying to reach would in fact be monitoring channel J (since the rescue vehicle driver would first have to change his channel selector to channel J as well). Central dispatchers often had the burden of manually directing the various different personnel to cross-group channels, and much time was wasted coordinating such efforts when emergency or disaster situations made time of the essence.

In contrast to the old crystal controlled fixed frequency systems, prior art trunked radio repeater systems rely upon preprogrammed group identifications rather than preset operating frequencies to provide the communications partitioning shown in FIG. 1. Trunked radio communications systems assign communications channels on an "as needed" basis for the exclusive use of calling mobile units requesting communications and to the group of mobile units being called. It is possible to provide much additional flexibility by pre-programming mobile units in advance with several different group identifications (thus making a given mobile unit a "member" of several different groups of transceivers). Since the number of groups the system can support is limited only by the RF signalling protocol providing identification of groups (and the programming capabilities of the mobile transceivers), it is possible to provide an almost arbitrarily large number of different logical groupings of transceivers—for example, the assignee's signalling protocol disclosed in U.S. application Ser. No. 056,922 to Childress et al entitled "Trunked Radio Repeater System" filed Jun. 3, 1987 and U.S. application Ser. No. 181,441 to Childress entitled "Trunked Radio Repeater System" filed Oct. 7, 1987 provides for individual identification of each and every mobile transceiver in the field and supports over 4000 different groups.

This trunked arrangement provides for much additional flexibility. For example, referring again to FIG. 1, a first group might be formed by all members of police squad A; a second group might consists of all members of police squad A and B; a third group might consist of a subset of police squad A (e.g., certain detectives and a supervisor); a fourth group might consist of all police supervisors from squads A and B; and a fifth group might consist of all members of police squad A and all members of the rescue squad.

Even though all groups are in effect "reusing" the same communications channels in this trunked radio system, the trunking is mostly transparent to individual users. That is, when a police officer in police squad A switches his "channel" (actually group) selector switch to correspond to the first group and actuates his "push-to-talk" microphone switch to make a call, his transceiver and all other active transceivers of police squad A are automatically controlled to switch to a free "working" channel temporarily dedicated to their use—and significantly, no other mobile transceivers are permitted to monitor or participate in the communications over this channel. This privacy feature afforded by trunked communications systems is important for providing each group of users with efficient, reliable communications, is critical for certain sensitive communications services (e.g., the police narcotics and detective squads) and is also critical for preventing interference from other users (e.g., the driver of a snow removal vehicle cannot interfere with communications between members of police squad A no matter what the snow truck driver does with his transceiver). Thus, in this respect the trunked system behaves from a user's view point like the prior systems in which each service had a channel dedicated to its exclusive use—while providing the radio spectrum and cost economy derived from channel and repeater sharing.

In a trunked environment, compartmentalizing radio transceivers into groups is essential to effective, reliable, private communications. In the past, however, such compartmentalization resulted in serious inflexibility when special situations arose. In most prior systems, all groupings of radio transceivers had to be defined beforehand (e.g., by hardwiring or preprogramming at the time the transceivers were issued to users and placed in the field). For example, when a police officer in squad A was issued his radio transceiver, the transceiver would typically be preprogrammed to respond to calls for certain groups and to never respond calls for other groups. A disaster situation (plane crash, major fire, landslide, earthquake, etc.) or a special event (e.g., county fair, parade and the like) might require this police officer to communicate with other users he normally does not communicate with. For example, those assigned to crowd control at a special event such as a parade might include a squad A police officer, a rescue squad vehicle, several municipal vehicles, and an officer from police squad B. It would be highly desirable to permit these different users to communicate with one another over their own communications channel for the duration of the special event without disturbing or interfering with communications of the rest of the two police squads, the rescue squad and the municipal vehicles.

Prior trunked repeater systems sometimes provided the capability of combining several groups together into a large group via a multiple group call—so that all members of, for example, police squad A, the rescue squad, all municipal vehicles and all members of police squad B could be collected onto a single communications channel in response to a single (typically dispatcher initiated) "multiple group call". The problem with this approach is that it involves too many radio users to be effective (i.e., many more than are needed for the necessary communications)—and more seriously, may draw users not involved in the necessary communications away from other radio calls important to them. The only really effective way in the past to accomplish the desired result was extremely inconvenient and costly—issuing each of the users a "floater" transceiver specially programmed for a spare group (and making sure they each returned their transceiver at the end of the special event).

The concept of "dynamic regrouping" in a trunked radio system is generally known. Dynamic regrouping allows a system operator to program customized group identifications into radio transceivers in the field from the central system facility at will—and dynamically form special groups for special purposes. Disasters such as plane crashes, severe storms, major fires, landslides and earthquakes as well as special events are all examples where the ability to quickly reconfigure radios could be a valuable tool to the public safeway officer. As an example, personnel involved in handling the crisis of a plane crash might include certain police officers, certain rescue vehicles, certain municipal vehicles and certain fire vehicles. It would be highly advantageous to provide some way to reconfigure the fixed, compartmentalized groups of transceivers normally provided by a trunked system to dynamically form special groups consisting only of these involved radio units—while preserving the units' existing group classifications (and thus, in some cases, their capability to make routine calls) and also without disrupting any other communications taking place on the system.

The need for dynamic regrouping typically arises when dispatchers and field personnel are under tremendous pressure to perform under unpredictable conditions. The trunked communication system should help alleviate confusion rather than contribute to it—so that if dynamic regrouping is to implemented at all, it must occur rapidly and predictably and in a fashion that can be monitored and controlled by any supervisor. It is especially important that activating a dynamically created group ("regroup") does not interfere with any ongoing radio communications in the field. Unfortunately, existing techniques for implementing dynamic regrouping have not met these demanding requirements and have therefore caused dynamic regrouping to remain in the realm of merely a great idea that cannot be practically implemented in the form of a usable tool.

Motorola, Inc. of Shaumburg, Ill. has developed a so-called "SMARTNET" trunked radio communications system which offers a limited dynamic regrouping capability. The optional dynamic regrouping capability provided in this 800 MHz trunked system allows the dispatcher to reassign radios into new talk groups without any mobile operator involvement to provide communications flexibility during emergency situations. Motorola's subscriber dynamic regrouping communications system is described in WO PCT Patent Publication No. 8701537 published Mar. 12, 1987 entitled "Method For Dynamically Regrouping Subscribers On A Communications System", and in press releases dated Aug. 6, 1987 and Jun. 27, 1986.

Briefly, the Motorola scheme provides for downloading a single dynamic reprogramming instruction to specified individual radio transceivers in the field via digital messages transmitted over the control channel to each of the transceivers individually. Upon receipt of the reprogramming message, the individual transceivers acknowledge the message, store the downloaded dynamic regroup identifier in an internal memory, and switch to a dynamic regroup mode in which they transmit and receive using the dynamic group instead of their old group(s). In another mode, a "group" dynamic regroup message is transmitted to an entire group of transceivers at a time in order to increase regrouping speed. The receiving transceivers begin using an alternate, fixed "dynamic code" previously programmed at time of manufacture and/or "personality PROM" programming. The units continue to use this "dynamic code" until dynamic regrouping messages cease being periodically transmitted over the control channel.

The following issued U.S. Patents may also be generally relevant to the concept of dynamic regrouping:

U.S. Pat. No. 4,594,591 to Burke
U.S. Pat. No. 4,517,561 to Burke et al
U.S. Pat. No. 4,152,647 to Gladden et al
U.S. Pat. No. 4,612,415 to Zdunek et al
U.S. Pat. No. 4,427,980 to Fennel et al
U.S. Pat. No. 4,553,262 to Coe Unfortunately, existing dynamic regrouping schemes (such as those described above) exhibit many practical problems when they are actually used in the real world. For example, existing techniques do not meet the demanding requirements of rapid and predictable regrouping which can be monitored and controlled by any supervisor—and which does not interfere with ongoing radio communications in the field.

The user interface has been one of the more widely and strongly criticized elements in existing dynamic regrouping schemes. Some criticize the user interface itself and others criticize the entire regrouping process because it is too confusing to be of any value. Existing dynamic regrouping schemes require a supervisor to specify "regroups" (new, dynamically configured groups) from the "ground up" by keying in an identification for each and every individual radio transceiver to be placed in the regroup—a difficult task to perform under time pressures of an emergency. Because dynamic regrouping changes the way the communications system operates on a very fundamental user level, for any practical and useful dynamic regrouping scheme the supervisor and the system dispatchers must be capable of: (a) accurately tracking—on an interactive basis—what radios are in what groups, (b) quickly assessing whether the regrouping process is proceeding in a suitable fashion or should instead be aborted or altered, and (c) easily altering regroup plans during activation or after they have been activated in response to changes in conditions and personnel. System supervisors and dispatchers must also be able to effectively handle and control communications during the regrouping process which, once initiated, causes entire groups to become fragmented and undefined until the process is complete. Existing dynamic regrouping systems simply do not meet these needs.

Additional complexity arises from the fact that most modern trunked communications systems serve a sufficiently large geographical service area to require multiple repeater sites—and it is not possible to determine which users are being served by which sites at the time dynamic regrouping is activated. Existing dynamic regrouping systems provide no quick and efficient way to set up and execute dynamic regrouping plans having no conflicting regrouping requests relative to any of the mobile transceiver involved. Very serious problems could also arise in existing systems if a site controller fails either while radios are being dynamically regrouped or after they have been regrouped.

Another serious inadequacy of prior dynamic regrouping schemes is the lack of support offered to field personnel. For example, the capability of placing only one dynamically configured group assignment in a transceiver at any time is generally insufficient. In an emergency, key personnel must be able to switch between two or more of "regroups"—but if their radio transceivers can accept only one regroup at a time, this switching is impossible. The police chief, the supervisors and other key personnel with the most knowledge, information and tactical experience become hamstrung because they are unable to participate in communications in more than one of the new dynamically configured groups.

Perhaps the most serious shortcoming of the existing dynamic regrouping schemes is that they often force users into "immature" groups for relatively long time periods. The dynamic regrouping process takes some time to complete in any system. An immature group is a group that is in the process of being formed by the regrouping process but because it is only partially formed, does not yet include enough transceivers to be an effective or usable group. The result is a temporary loss of communications effectiveness as transceivers are removed from existing groups and placed into a new group—where they must wait for the regrouping process to reach some sufficient level of completion before effective communications can be established.

For example, assume an officer in the field is involved in a communique exchange and suddenly finds his transceiver automatically locked in a "regroup" with only one or two other transceivers. The system has not yet regrouped other radios into this new group, so he cannot yet communicate effectively in the new group—and he also cannot communicate in the old group his transceiver was just removed from because the dynamic regrouping scheme has forced him into priority communications with the regroup. Meanwhile, the dispatcher has no idea at any given time who has or hasn't yet been regrouped, and therefore does not know what groups to talk to to reach specific personnel. A solution to this problem offered by the prior art is to permit each transceiver to generate a "reprogram request" which the dispatcher must manually respond to. This is hardly an effective solution for the officer in the field during an emergency.

One way to lessen the bad "side effects" of the dynamic regrouping process is to make the process occur as rapidly as possible. Unfortunately, the task of reaching and remotely reprogramming, in a reliable manner, tens or hundreds of geographically scattered transceivers is a difficult task to accomplish at any speed, let alone as rapidly as possible. The flow of information from the regrouping terminal to the repeater site or sites, the rate at which transceivers can be regrouped, and the resulting loading of the digital control channel (which adds to existing control channel loading from other communications the system is supporting) are interrelated items that must work together effectively if the regrouping process is to proceed effectively. The regrouping process should occur as rapidly as possible to minimize the amount of confusion it creates. Unfortunately, existing dynamic regrouping schemes have not been designed with the real world in mind. Regrouping over the control channel limits the rate at which radios can be regrouped to only a few per second at best (due to the limited data transfer rate over the control channel and normal control channel loading). This limited regrouping rate is further aggravated by requiring the regrouping terminals to send initial requests via the control channel. Of course, multi-site configurations require regrouping terminals in the range of each individual site—hardly an effective or efficient solution.

The present invention provides an improved dynamic regrouping scheme which includes an effective user interface, automatic support of multi-site systems, the capability to program individual radio transceivers with multiple new groups dynamically, a fast rate of reconfiguration, instantaneous switch over to prevent radios from residing in immature groups, and a satisfactory mode of operation should the site controller (or site controllers in non-fault tolerant systems) fail. Some of the features and performance specifications provided by the presently preferred exemplary embodiment of the present invention include:

Features

Unlimited prestored plans
Unlimited source and destination groups per plan
Regrouping at the plan or destination group level
Advanced user interface
Automatic support of multiple sites
Fast regrouping
    Regrouping at a rate of over 30 radios per second is possible while reducing loading on the control channel.
Fast activation/deactivation
    Each plan can be immediately activated or deactivated. Users are effectively regrouped together.
Up to 8 regroups per radio If a radio does need multiple regroups, the user interface allows the supervisor to specify the knob setting for each regroup.

In accordance with one significant feature of the invention, dynamic regrouping is permitted to proceed extremely rapidly with very little additional loading on the digital control channel and without being affected by existing control channel loading. Dynamic regrouping takes place in two phases in the preferred embodiment. In "phase I", a special dynamic regroup call is transmitted over the control channel which directs an entire transceiver "source group" to a working channel (this source group is defined in terms of a "normal", existing transceiver group). Typically, only some and not all of the transceivers in the "source group" are actually to be dynamically regrouped. All of the transceivers in the source group react by retuning to a further communications channel normally used by the system as a working channel—just as they would for a "normal" group call. However, the further communications channel has meanwhile been reconfigured by the system as an alternate control channel—and carries all of the control channel signalling needed to efficiently handshake with and transfer messages to and from the transceivers (the alternate control channel is distinguishable from the "real" control channel so that transceivers from different groups do not mistake the alternate control channel for the "real" control channel). Since the alternate control channel to handles only messages for regrouping selected members of the source group and is not loaded with control messages for other systems communications (and also because of the 9600 bps data control channel transfer rate of the preferred embodiment), dynamic regrouping messages transmitted over the alternate control channel can "regroup" transceivers on an individual basis extremely rapidly (e.g., 30 or more transceivers per second).

The communications system can activate as many alternate control channels simultaneously as desired—and thus simultaneously dynamically regroup many different source groups each containing tens or hundreds of transceivers.

Not all required transceivers typically respond to a dynamic regroup call issued at a given site at a given time. Some transceivers may be in the service range of a different repeater site, other transceivers may be inactive (e.g., "off"), and still other transceivers may be temporarily unavailable (e.g., blocked by an obstruction from communicating with the site). In accordance with another feature of the invention, a central regrouping terminal constantly monitors the progress of the regrouping process, and coordinates the process between different sites in a multi-site configuration. After phase I of the regrouping process is completed, the central terminal causes the system to begin "phase II" in which the alternate control channel is released and dynamic regrouping messages are periodically sent over the main control channel— but only to those few individual transceivers that failed to respond to the phase I messages (the number of transceivers that "missed" the phase I signalling will generally be relatively small, so that the main control channel is not overloaded or backed up with dynamic regrouping messages and acceptable control channel message handling rates can be maintained for routine communications as well as for the phase II dynamic regroup messages).

In accordance with still another feature of the invention, dynamic regroup activation does not actually occur in either phase I or phase II in order to avoid the formation of immature regroups. Phase I and phase II of the process simply make the new "regroup" information "resident" in the transceivers being regrouped—and the system automatically keeps track of which transceivers have actually responded. A regroup is not activated until (a) a sufficient number of transceivers in the regroup have responded, and (b) certain transceivers specified as being critical to the effectiveness of the regroup have responded. When both of these requirements have been met, a further message transmitted over the main control channel to the source groups forming the regroup cause all of the transceivers previously made "resident" in the regroup to immediately activate the regroup. Multiple regroups can be active and/or "resident" on the system simultaneously.

Meanwhile, a system manager may interactively monitor and modify the regrouping process as it progresses through an advanced user interface which is a further feature of the invention. The user interface provides instantaneous status information regarding what units have been made "resident", what units have become active in a regroup, and what units are still being searched for. The system manager can alter the regrouping process as it progresses (e.g., abort the process, delete certain units from the regroup and add other units, etc.). The system manager can also easily remove units from and add units to an active regroup at will.

In accordance with still another feature of the invention, the advanced user interface permits a user to specify regroups on several different levels. In particular, the dynamic regrouping process is defined in terms of plans, source groups and destination groups ("regroups"). Each regroup plan may specify multiple destination groups—and the system manager may activate the entire plan, or only some of the destination groups in the plan. Significantly, the system manager specifies what transceivers are in a particular destination group by specifying the "source" group (i.e., normal group classification) of those transceivers. As each source group is selected, all transceivers in the source group are listed on a display and the system manager can select some and omit others from the destination group. The source groups selected in this manner are the same ones called in "phase I" of the dynamic regrouping processes discussed above.

Any given transceiver can be included in multiple regroups simultaneously, and the advanced user interface permits the system manager to allocate specific regroups to specific positions on the group selector control knobs and also make regroups mandatory or user selectable (e.g., to specify whether the user is forced into a regroup and/or can tune to a different group once regrouped) on a transceiver by transceiver basis. This flexibility permits the system manager to avoid conflicting transceiver regroup assignments and actually define to some extent the manner in which the transceiver operators interface with the reconfigured system.

In accordance with a further feature of the invention, both handshaking and non-handshaking dynamic regroup deactivation is provided. The preferred technique for deactivating an active regroup is to perform a signalling exchange similar to the "phase I" signalling used for making a dynamic regroup "resident"—and positively deactivate the regroup in each transceiver with each transceiver positively acknowledging deactivation. However, to prevent regrouped transceivers that "miss" the deactivation signalling from becoming trapped in dynamic regroup "limbo", a further means to deactivate regroups is also provided. A message is periodically transmitted over the main control channel specifying on a plan-by-plan basis which plans are active and which plans are inactive (and also which plans are "resident" and which plans are non-resident). Such message transmission is maintained long after dynamic regroup plans are deactivated. Any transceiver active in a regroup which receives a message specifying that the regroup is inactive immediately deactivates the regroup—thus providing an immediate, "fail-safe" way to deactivate regroups (e.g., if the system manager panics) and to also deactivating regroups in transceivers that "missed" the handshaking deactivation signalling.

These as well as other features and advantages of this invention will be more completely understood and appreciated by carefully studying the following detailed description of the presently preferred exemplary embodiment taken in conjunction with the accompanying drawings, of which:

FIGS. 5–7 are schematic flowcharts of exemplary data structures maintained by site controller 410 for implementing dynamic regrouping functions;

Figure 13:
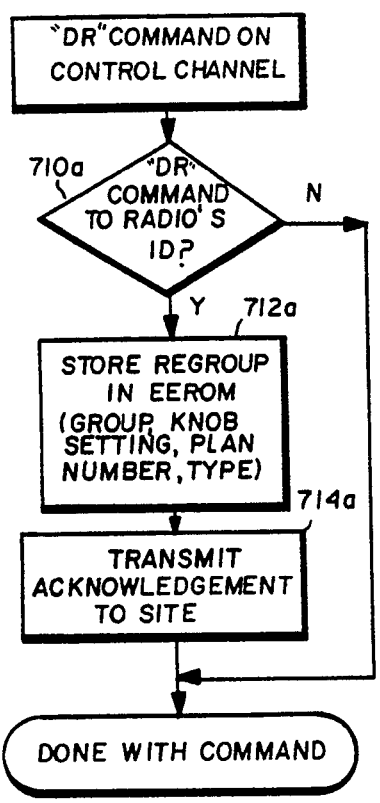
Figure 16:
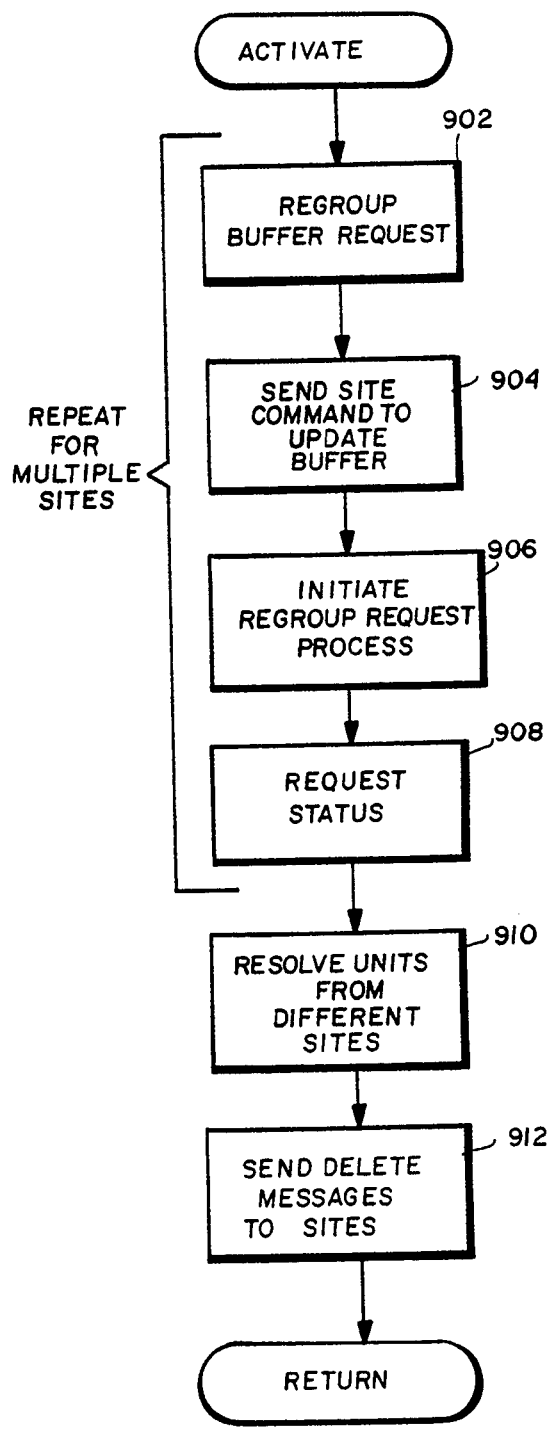
Figure 14:
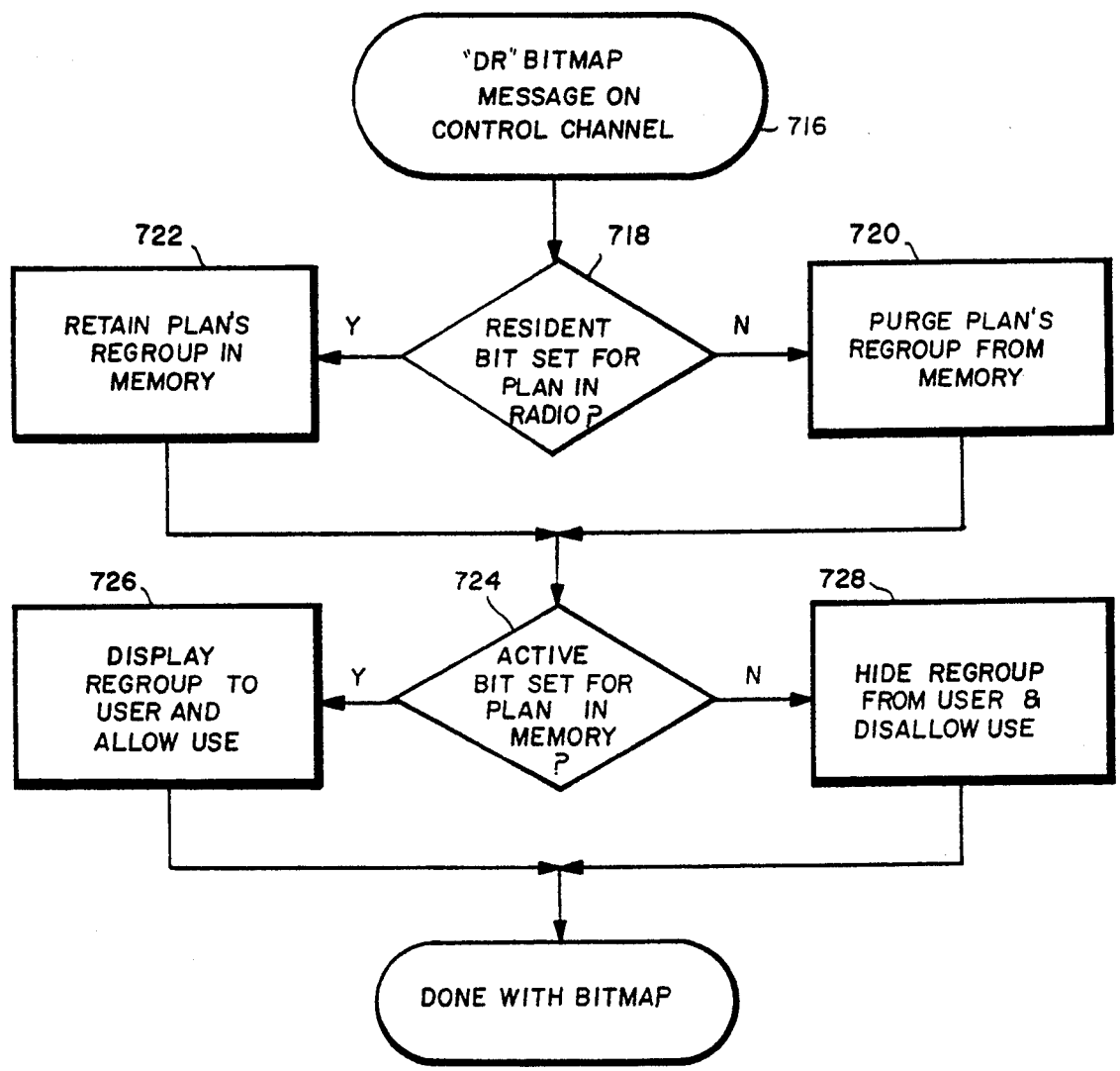
Figure 15:
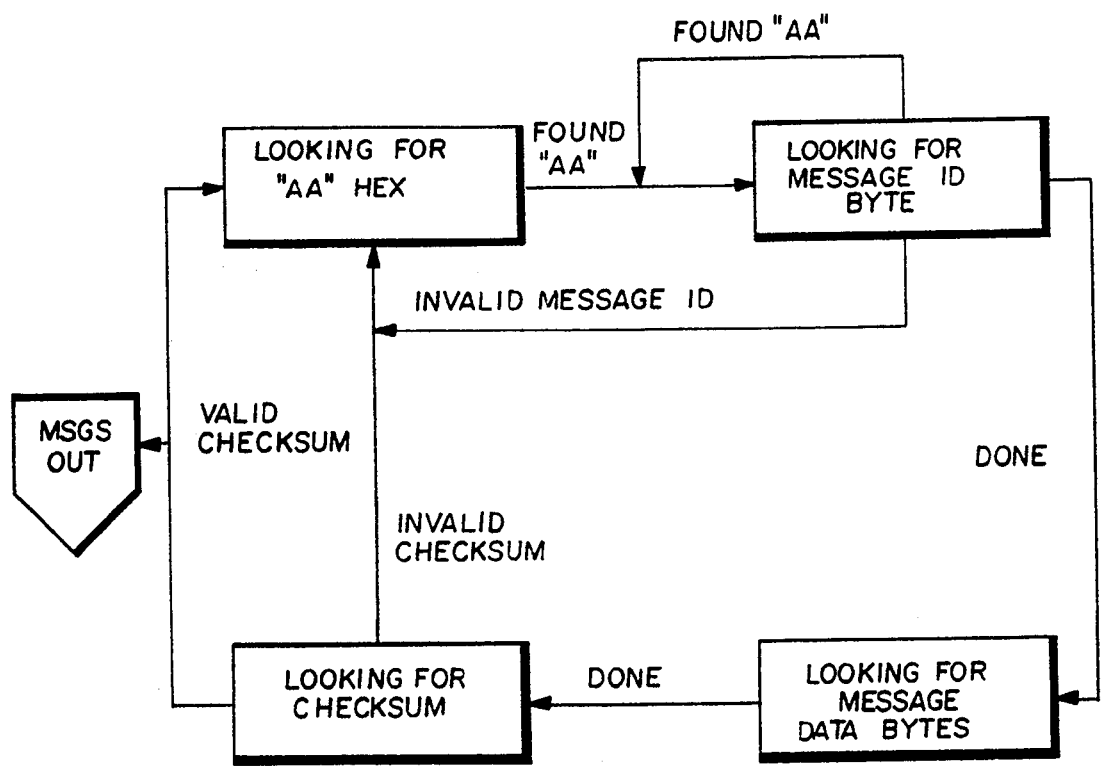

FIGS. 8–14 are flowcharts of exemplary program steps performed by site controller 410 and mobile/portable radio transceivers 150 to implement the dynamic regrouping features provided by the present invention; and FIGS. 15–16 are flowcharts of exemplary program control steps performed by system manager 416 and site controller 410 to implement the dynamic regrouping features provided by the present invention.

DETAILED DESCRIPTION OF PRESENTLY PREFERRED EXEMPLARY EMBODIMENTS

OVERALL SYSTEM ARCHITECTURE

Figure 2:
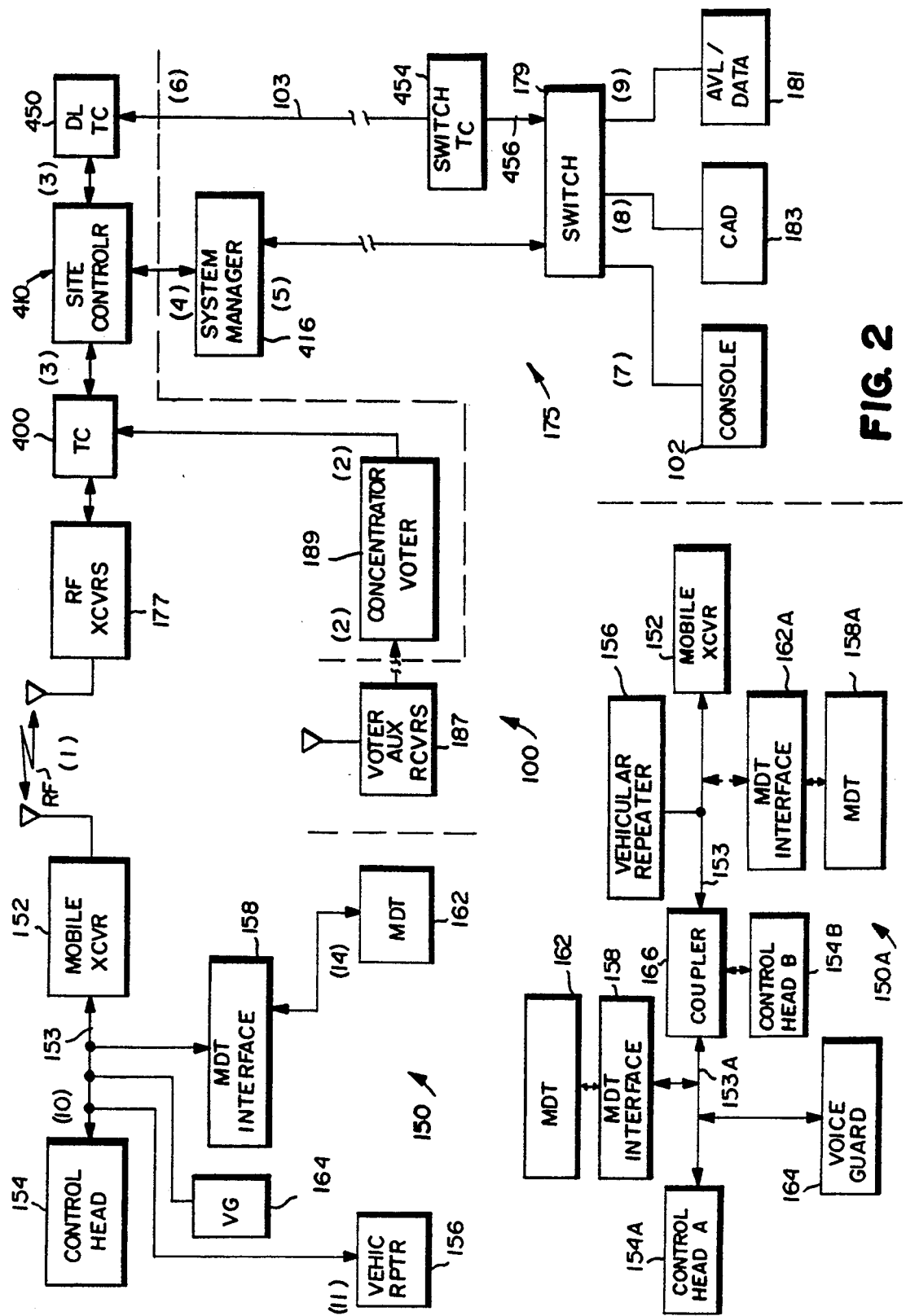
FIG. 2 is an overall block diagram of a digitally trunked radio repeater system with dynamic regrouping capability in accordance with the presently preferred exemplary embodiment of the present invention.

An exemplary trunked radio repeater system 100 in accordance with this invention is generally depicted in FIG. 2. System 100 includes at least one (and typically many) mobile (or portable) radio transceiving stations 150 and at least one (and typically many) RF repeater stations 175. Mobile transceiving station 150 communicates via an RF link and repeater station 175 with other mobile transceiving stations and/or with landbased parties connected to the repeater station by conventional dial-up landlines.

Figure 1:
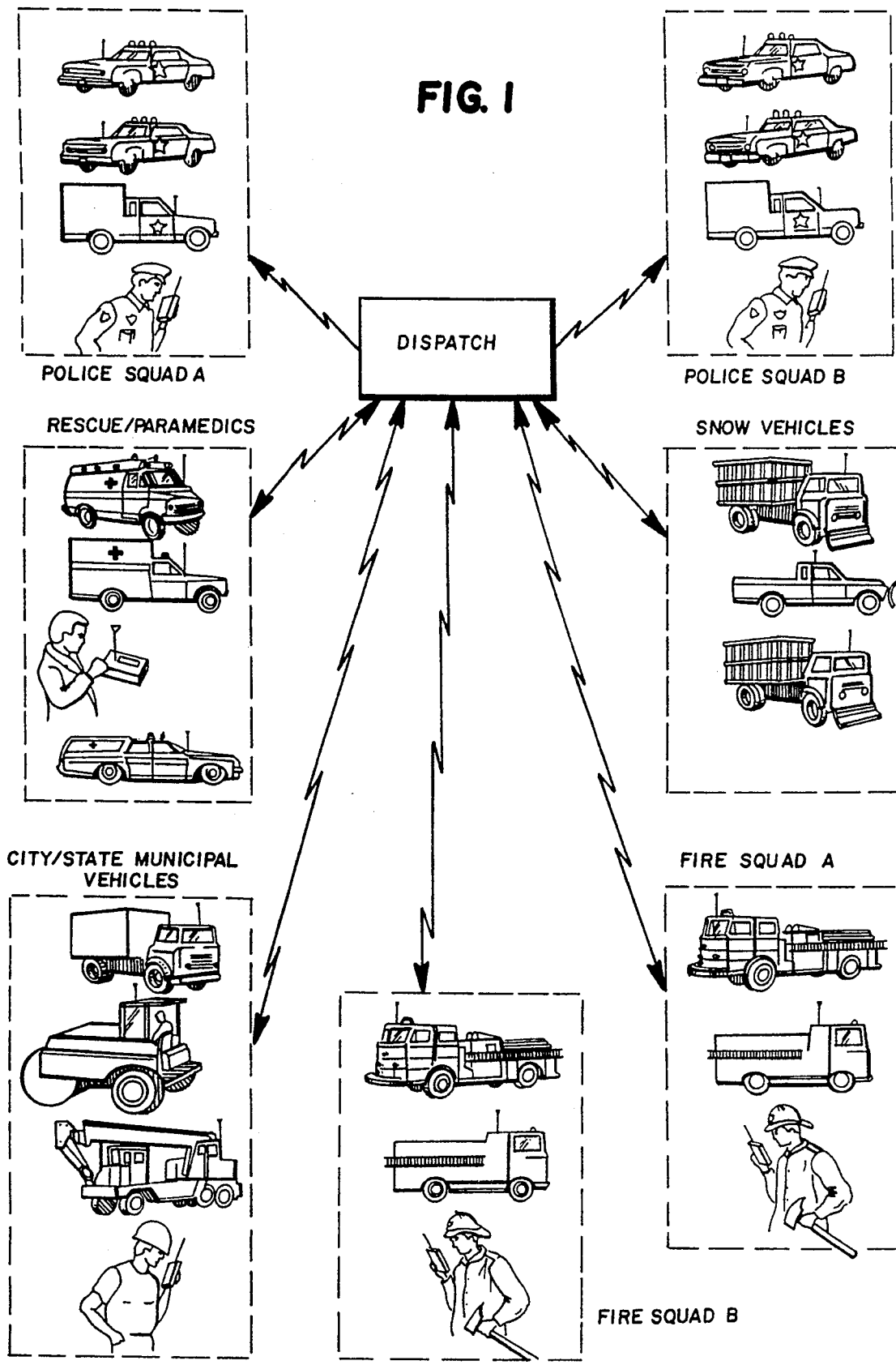
FIG. 1 is a schematic diagram of simplified exemplary user groupings in a typical trunked radio repeater system.

Repeater station 175 includes a site controller 410, individual repeater channel transceivers 177, and a multiplexing telephone interconnection network ("switch", or "MTX") 179. Site controller 410 is preferably a mainframe digital computer which oversees the general operation of repeater station 175. In particular, site controller 410 controls the operation of RF transceivers 177 by transmitting digital signals to and receiving digital from "trunking cards" ("TC") 400 connected between the site controller and individual transceivers (although only one transceiver 177 and one trunking card 400 are shown in FIG. 1, there typically are many such trunking card/transceiver combinations in repeater station 175—one for each RF channel the repeater station operates on).

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager computer system 416 (hereafter referred to as the "system manager") is connected to site controller 410 and to switch 179 to allow a system manager to oversee and control the overall operation of system 100—and to control the dynamic regrouping process.

A remote receiver 187 and associated concentrator/voter 189 may be connected to trunking card 400 to allow so-called "RSSI" signal strength measurements to be based on the stronger of the signal level received at the central repeater station site and the signal level received at a remote site—thereby increasing the reliability of such measurements.

An RF link ("RF") connects RF repeater transceivers 177 with mobile transceiving stations 150. Mobile station 150 is capable of transmitting digitized voice or digital data signals (encrypted or unencrypted) to and receiving such signals from repeater station 175 over the RF link.

In the configuration shown in the upper left-hand portion of FIG. 2, mobile station 150 includes a mobile RF transceiver 152 connected to a control head 154 via a serial digital bus 153. Mobile transceiver may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm.

In the alternate mobile radio configuration shown in the lower left-hand corner of FIG. 2, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired. Systems manager 416 is capable of specifying new groupings and causing such new groupings to be dynamically activated on command, as will be explained shortly.

CENTRAL SITE ARCHITECTURE

Figure 3:
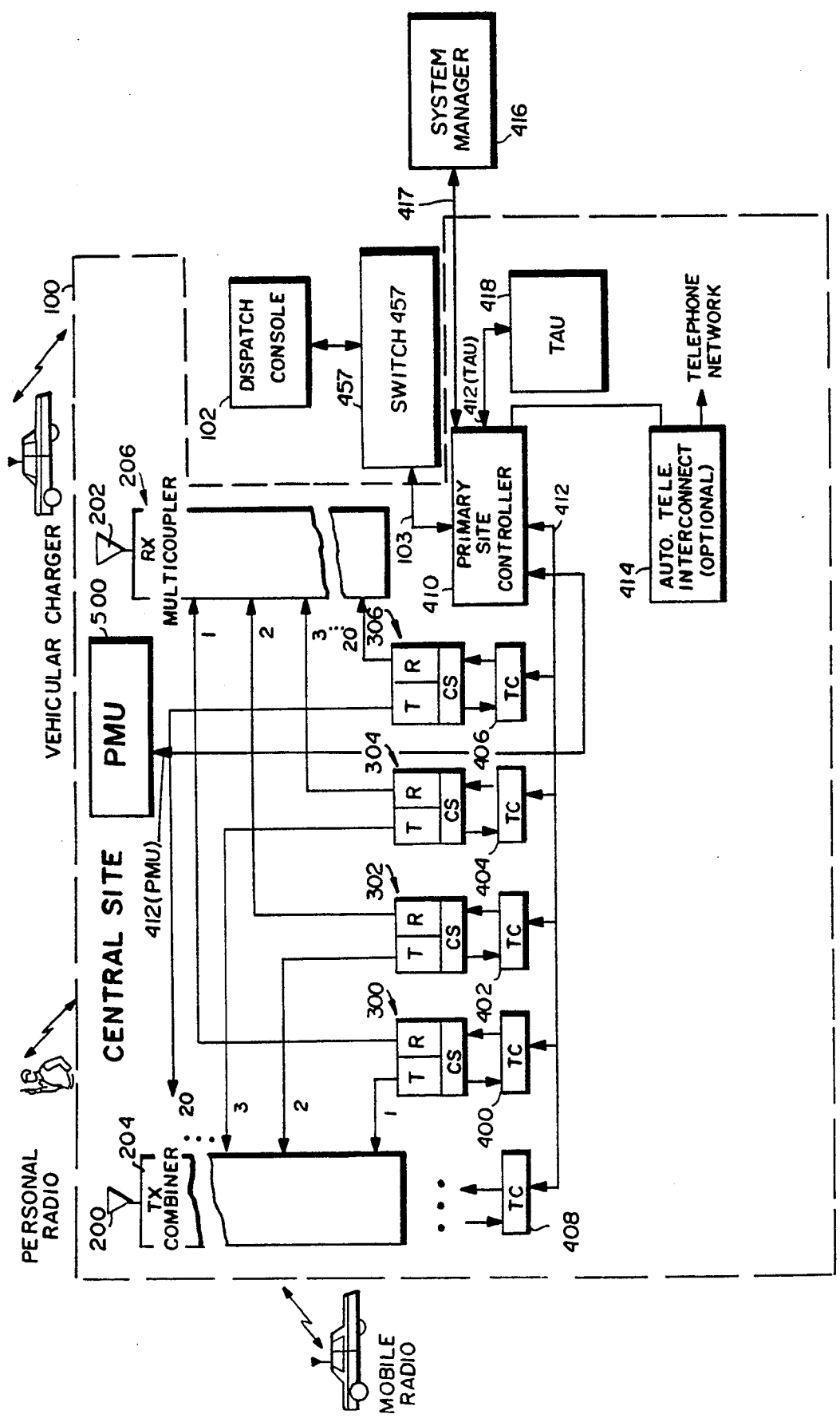
FIG. 3 is more detailed schematic block diagram of the repeater site architecture shown in FIG. 2.

Briefly, referring now more particularly to FIG. 3 (a block diagram of a single repeater site of which typical systems may have more than one), a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200–206 thus individually services a plurality of duplex RF channel transmit/receive circuits included in a plurality of RF repeater "stations" 300, 302, 304, 306, etc. Typically, there may be 24 such stations. Each station transmitter and receiver circuitry is typically controlled by a dedicated control shelf CS (e.g., a microprocessor-based control circuit). Such control shelf logic circuits associated with each station are, in turn, controlled by "trunking cards" TC (e.g., further microprocessor-based logic control circuits) 400, 402, 404 and 406. Another trunking card 408 may be dedicated for digital data communications if desired.

All of the trunking cards 400–408 communicate with one another and/or with a primary site controller 410 via control data links 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions are incorporated within the trunking cards 400–408 so as to provide continued trunked repeater-service even in the event that controller 410 malfunctions or is otherwise taken out of service.

An optional telephone interconnect 414 may also be provided to the public switched telephone network. A system manager 416 is also provided for overall system management and control (together with one or more dispatcher consoles 102).

A power monitoring unit (PMU) 500 allows site controller 410 to monitor the actual RF parameters associated with repeater system 100. For example, PMU 500 constantly monitors power output of each repeater channel, as well as insertion loss and VSWR (voltage standing wave ratio) of each repeater antenna. PMU 500 is connected to site controller 410 via a high speed data link 412 (PMU).

A test, alarm and control unit (TAU) 418 is provided for detecting and diagnosing error conditions.

RF SIGNALLING ARRANGEMENT AND PROTOCOL

The RF signalling protocols and formats used in the preferred embodiment are described in detail in copending commonly assigned application Ser. No 181,441 filed Apr. 14, 1988 entitled "Trunked Radio Repeater System (Atty. Docket no. 46-88, Client Docket No. 45-MR-560), the entire disclosure of which is incorporated herein by reference as if expressly set forth herein.

Briefly, all inactive radio transceivers monitor a digital RF control channel for messages which identify groups the transceivers are members of. To establish "normal" communications between a mobile transceiver and other transceivers within its group, the mobile transceiver transmits a channel request message over the control channel. In response, the site transmits a channel assignment message directed to the transceiver group—this assignment message specifying a free working channel. All of the transceivers in the group react to this channel assignment message by retuning to the specified working channel. Voice and/or data communications are permitted between the transceivers in the group over the working channel after various handshaking signalling has been exchanged.

The signalling protocol described in the above-mentioned copending application (atty docket no. 46-88) has been supplemented with several additional messages used to implement dynamic regrouping. Exemplary message formats for those messages appear below.

| OUTBOUND CONTROL CHANNEL MESSAGES Dynamic Regroup | |
|---|---|
| Message #1 | |
| FORMAT: 27...0 | |
| 111 | MT-A |
| 111 | MT-B |
| 10000 | MT-D |
| fff | Number of fleet bits |
| 1111111111111 | Logical |
| Message #2 | |
| FORMAT: 27...0 | |
| 111 | MT-A |
| 111 | MT-B |
| | Partial MT-D |
| pppp | Plan number |
| tt | Regroup type |
| kkk | Group knob setting |
| — | Undefined |
| gggggggggg | Group |
| Second message | |
| Regroup type definition: | |
| 00 → Forced select, no deselect | |
| 01 → Forced select, optional deselect | |
| 10 → Undefined | |
| 11 → Optional select | |

This dynamic regroup message specifies the new group into which the unit is being regrouped. The fff field specifies the number of fleet bits used in this particular agency (to allow the radio to continue fleet call decoding during the regroup). The group knob setting field specifies the dynamic regroup knob position within the radio to be used (000 indicates position 01, ..., 111 indicates position 08). These bits (along with the type bits) are echoed in the inbound acknowledgement. The pppp field specifies a dynamic regroup plan number. See the outbound control channel PBM (Plan Bit Map) message for explanation of the use of plan numbers.

This message is sent in "phase I" on an alternate control channel and in "phase II" periodically as a background task of the control channel. In failsoft or before the site controller informs the control channel trunking card of plan status, all bits will be set.

| CANCEL DYNAMIC REGROUP | |
|---|---|
| FORMAT: 27...0 | |
| 111 | MT-A |
| 111 | MT-B |
| 00000 | MT-D |
| kkk | Group knob setting |
| 111111111111 | Logical ID |

PURPOSE:

To cancel the dynamic regrouping function performed on a radio. The group knob setting field specifies the dynamic regroup position being cancelled. These bits must be echoed in the acknowledgement in the preferred embodiment.

| SYSTEM DYNAMIC REGROUP PLAN BIT MAP | |
|---|---|
| FORMAT: 27...0 | |
| 111 | MT-A |
| 111 | MT-B |
| 00100 | MT-D |
| b | Plan bank |
| rrrrrrrr | Plan residency |
| aaaaaaaa | Plan activation | b = Plan bank bit. A "0" here means plans 0 through 7 are described in the residence and activation fields. A "1" here means plans 8 through 15 are described in the residence and activation fields.
rrrrrrrr = Plan residency bits. The first bit in this field (MSB) is plan 7 (15 if b is set). The last bit (LSB) is plan 0 (9 if b is set). A "1" in the plan's residence bit informs mobiles that the plan is resident on the system.
aaaaaaaa = Plan activation bits. First bit (MSB) is plan 7 (15 if b is set). Last bit (LSB) is plan 0 (8 if b is set). A "1" in the plan's activation bit informs mobiles that the plan is active on the system.

PURPOSE:

To notify all units of resident and active dynamic regroup plans.

Plans are numbered from 0 to 15, divided into two banks of 0-7 and 8-15. In the preferred embodiment, a mobile or portable unit can only participate in one plan at a time, and can hold at most 8 dynamic regroups from that plan. The plan number is passed to the units in the dynamic regroup messaging. A resident plan is one which has been (or is being) downloaded to the mobile and portable units. The plan is not available for user access at this point, but is retained by the units. An active plan is one which is available for user access.

Active plans must first be made resident. Any unit which has loaded regroups from a given plan will automatically remove them from memory if the resident bit for that plan is 0 in this message. No acknowledgement is sent to the site when this occurs.

DATA STRUCTURES MAINTAINED BY SITE CONTROLLER 410

Below is a brief discussion of the implementation and functionality of the major data structures used by site controller 410 in the preferred embodiment to implement dynamic regrouping. These data structures are updated periodically by system manager 416 in a manner that will be explained shortly.

Two data structures are maintained by site controller 410 to keep track of and control the dynamic regroup process: a queue 1400, and a "regroup control buffer" 1420. The queue 1400 maintains information about individual transceivers 150 involved in the regrouping process, while buffer 1420 stores status information about regroups.

The primary data storage area for the dynamic regrouping task is the queue data structure 1400 shown in FIG. 5. Queue 1400 consists of an array of 1024 queue elements 1402(0) – 1402(n) in the preferred embodiment—each element relating to a specific individual transceiver to be regrouped. Each queue element 1402 contains a logical/unit id field 1404, a home (source) group id field 1406, a field 1408 pointing to the next element in the same regroup (or a "−1" for the last element for the regroup in the queue), a status field 1410, and a unit control block 1412. Status field 1410 is used in the preferred embodiment to identify those units that have responded to the regroup command.

The unit control block field 1412 contained in each queue element 1402 identifies the type regroup request for that particular unit, the unit's acknowledgement flags, and the unit's group knob setting. The diagram below shows an exemplary format for the unit control block 1412 in the preferred embodiment:

| B15 | B12 | B10 | B9 | B8 | B7 | B6 | B3 B2 B1 B0 |
|---|---|---|---|---|---|---|---|
| A | \| Unused | \| B | \| C | \| D | \| E | \| F | \| Unused |
| B15 through B13 | (A) group knob setting | | | | | | |
| B12 through B10 | unused | | | | | | |
| B9 through B8 | (B) type request | | | | | | |
| 00 → | forced select, no deselect | | | | | | |
| 01 → | forced select, option deselect | | | | | | |
| 10 → | undefined | | | | | | |
| 11 → | option select | | | | | | |
| B7 | (C) active pending | | | | | | |
| B6 | (D) active | | | | | | |
| B5 | (E) cancel pending | | | | | | |
| B4 | (F) cancelled | | | | | | |
| B3 through B0 | unused | | | | | | |

When a mobile responds to a regroup command, the "active pending" bit in the corresponding unit control block record 1412 must be cleared. Unfortunately, in the preferred embodiment the only identifiable means finding the queue element is through the logical id. However, in the preferred embodiment, records 1402 of queue 1400 are not sorted by logical id field 1404, and although indexed by pointer 1408 for associated regroup, may be scattered throughout the queue in any order. To search the queue by logical ID field would be very inefficient without some higher level search algorithm. In the preferred embodiment, a sort control block is maintained which provides an array of pointers. These pointers point "into" the queue 1400, and index the queue records 1402 by sorted logical identification field 1404.

A queue control block, a further data structure used to implement dynamic regrouping in the preferred embodiment, is a simple structure that maintains information regarding queue space used, queue spaced allocated and a pointer to the free list. This queue control block permits the system to manage the queue 1400. An exemplary format for the queue control block is shown below:

| Total Used | Total Allocated | Free Pointer | RCB Cnt | Service |
|---|---|---|---|---|
| | | | | |

Another data structure used in the preferred embodiment to implement dynamic regrouping is the regroup control block 1420 schematically shown in FIG. 6. A regroup control block 1420 is created for each active or resident regroup plan on the system. The regroup control block 1420 includes a record 1422 corresponding to each regroup (destination group) in a particular regroup plan. Each record 1422 contains information about the dynamic regroup process, including: the destination group id field 1424 (primary identifier of each regroup process); a field 1426 pointing to the first unit in the regroup; a field 1428 pointing to the last unit in the process; a field 1430 containing the current number of elements available (allocated—currently used); a counter 1432 containing the number of times to retry the regroup before reporting the status to the system manager; the current retry count 1434; a status field 1436; and an "acknowledge pending" bit 1438.

FIG. 7 is a detailed schematic diagram of an exemplary status field 1436, this field containing an active/inactive field 1436(a) and a fleet decode field 1436b. The following describes the significance of fields 1436a,b:

Active/inactive field 1436a:
0→regroup is not currently active
1→active regroup
Fleet decode field 1436b:
Contains fleet number decoding information Site controller 410 data structures handle dynamic regroup information on the regroup level rather than on the plan level. It is the responsibility of system manager 416 to manage regrouping processes in the preferred embodiment to permit activation of entire regroup plans.

Figure 8:
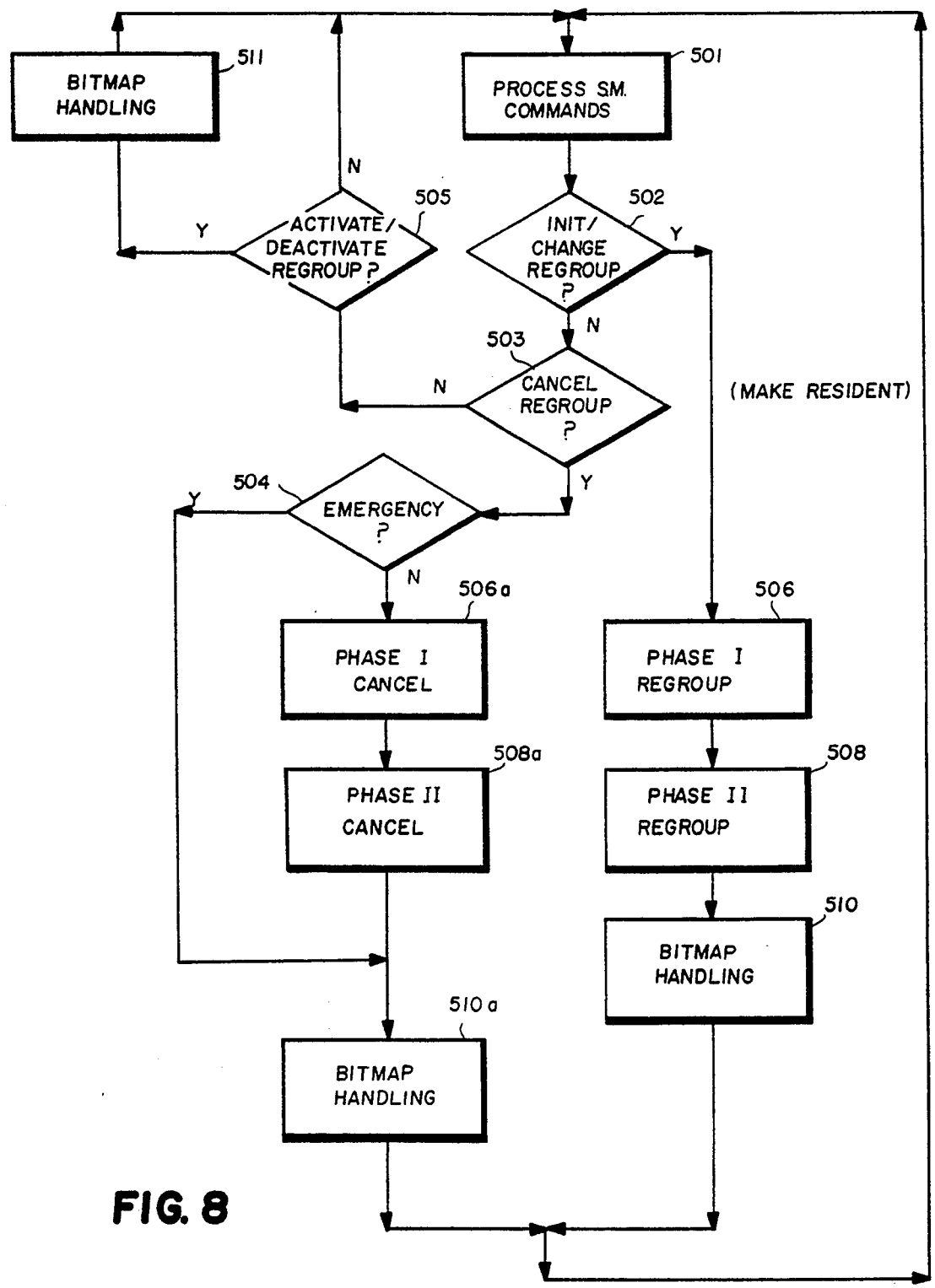
Figure 9:
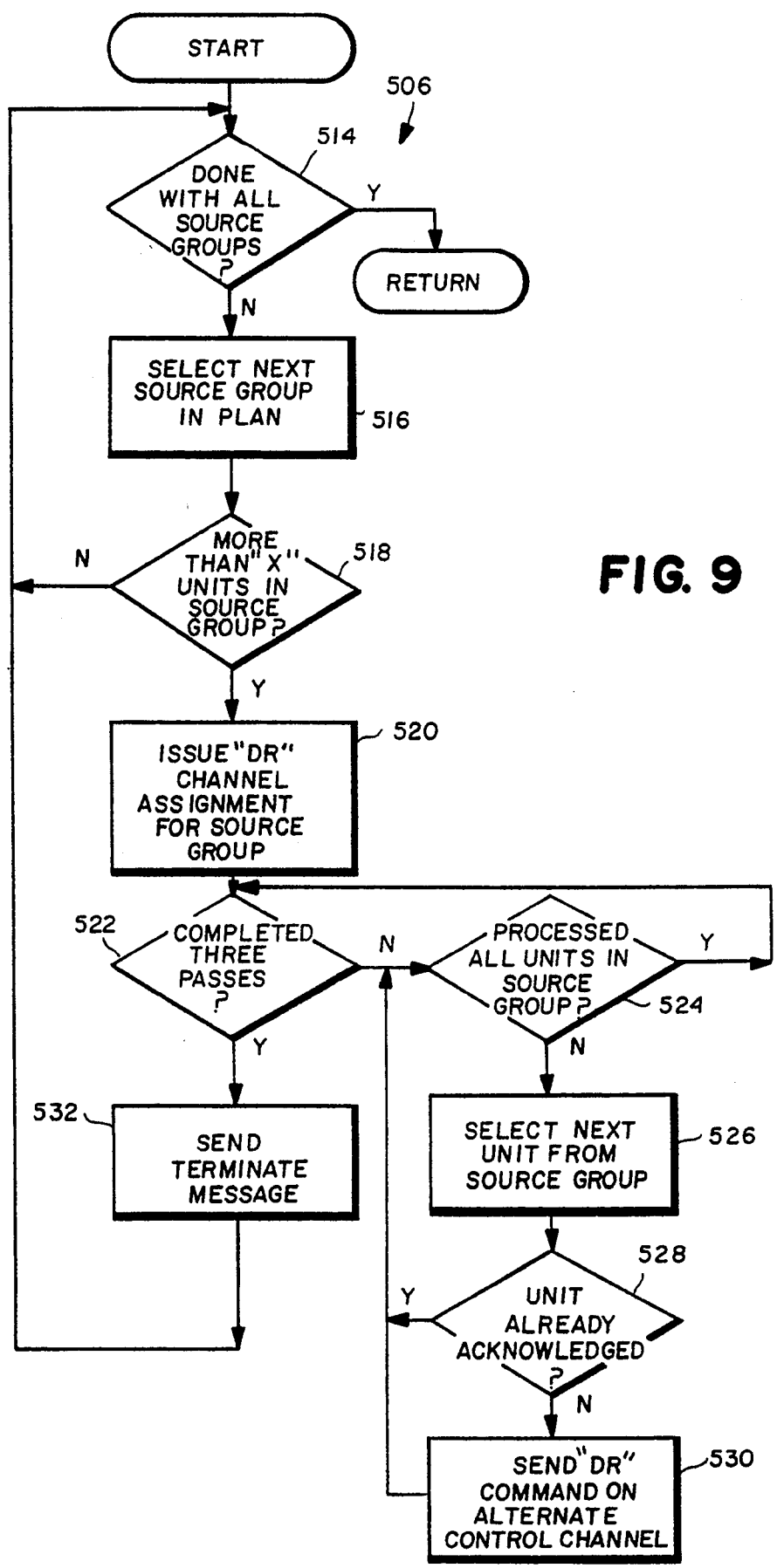
Figure 10:
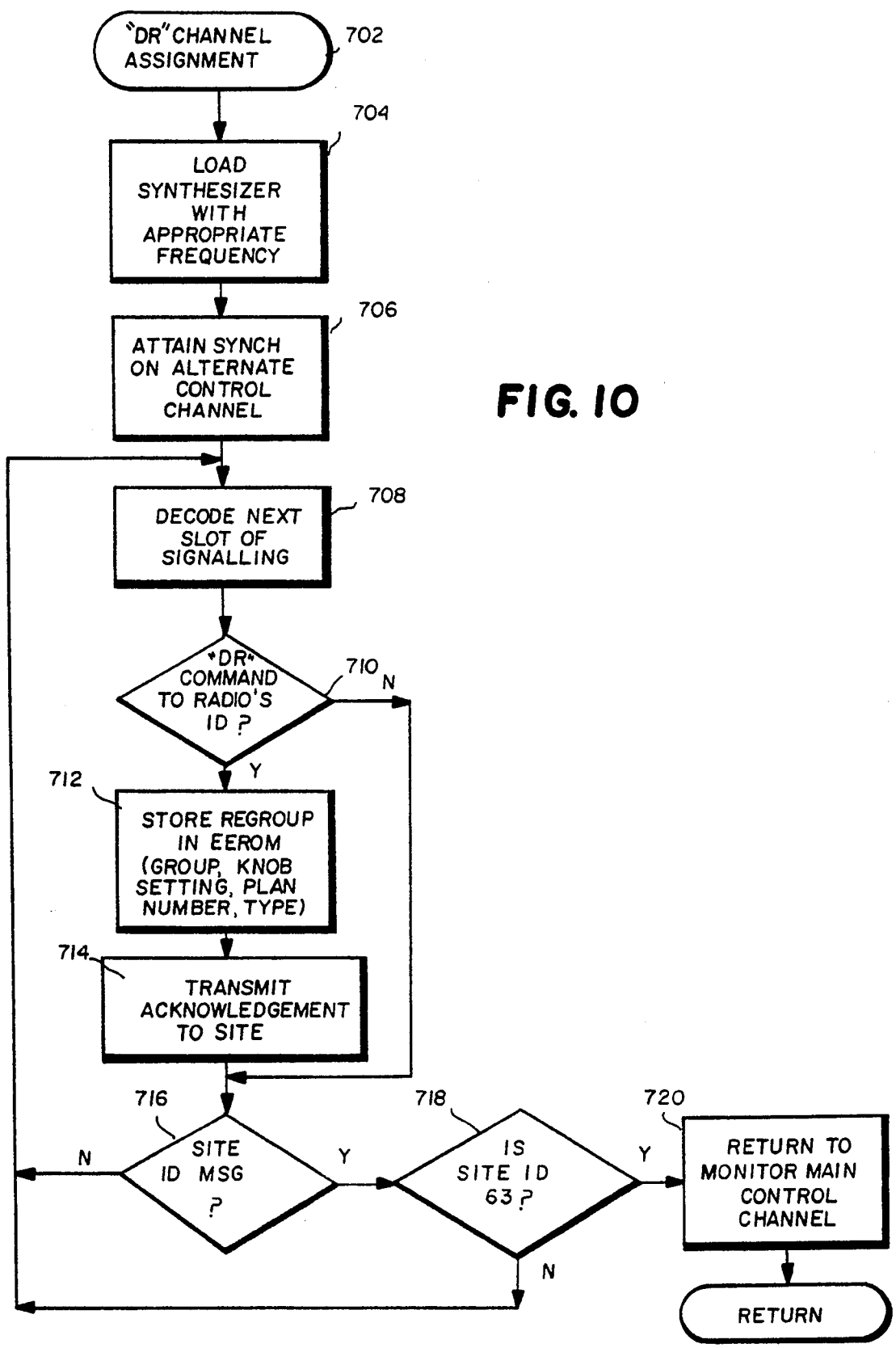
Figure 12:
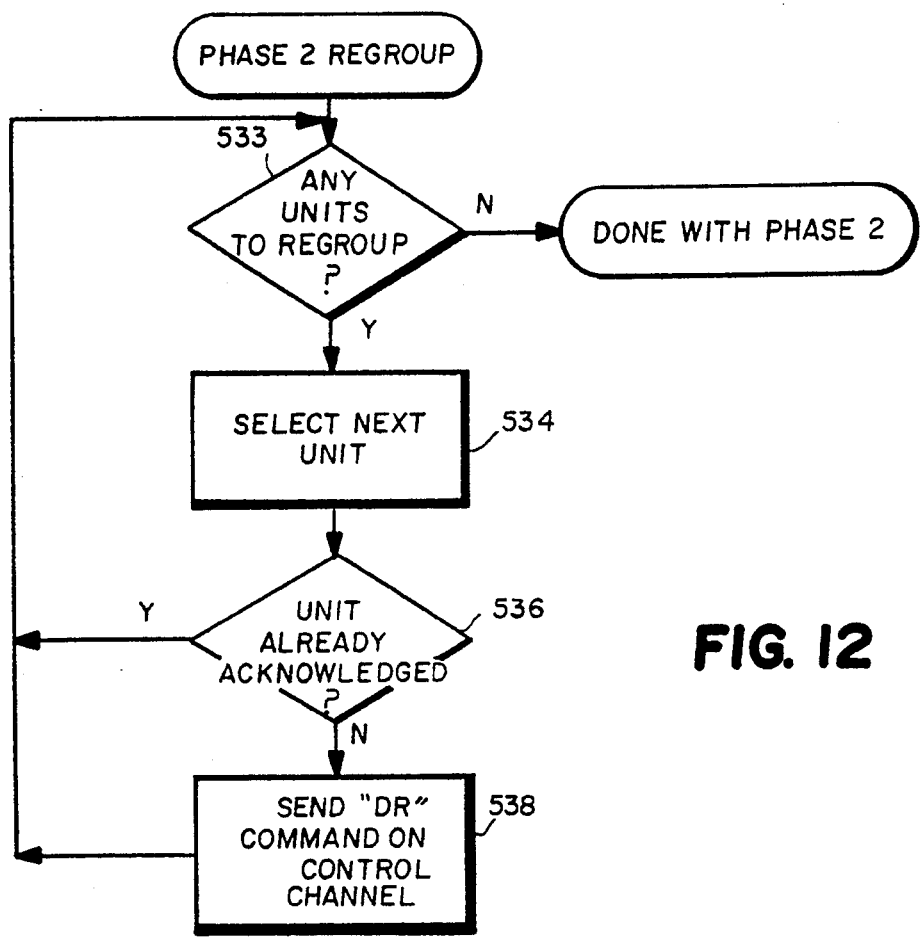
Figure 11:
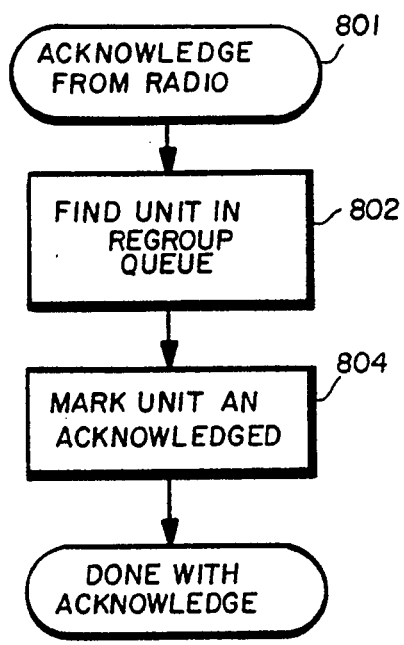

FIG. 8 is a flowchart of exemplary program control steps performed by system 100 to manage dynamic regrouping; FIGS. 9, 11 and 12 are flowcharts of exemplary program control steps performed by site controller 410 in the preferred embodiment to implement the dynamic regrouping function; and FIGS. 10, 13, and 14 are flowcharts of exemplary program control steps performed by mobile radio transceiver 150 for implementing dynamic regrouping in the preferred embodiment. These FIGS. 8-14 will be discussed together in order to describe the overall steps performed by system 100.

All dynamic regrouping commands originate at system manager 416 in the preferred embodiment. System 100 processes these commands (FIG. 8 block 501) by first decoding them to determine whether they are commands to make a regroup resident or change a resident regroup (decision block 502); commands to cancel a regroup (decision block 503); or commands to activate/deactivate a resident regroup (decision block 505).

If the inputted command requires a new regroup to be made resident on system 100 (block 502), system manager 416 sends messages to site controller 410 requiring it to initiate the regrouping process (in the preferred embodiment, this command is actually carried out by first updating site controller data structures 1400, 1420 with information needed to begin the regrouping process, and then sending the site controller a "start regroup" request, as will be explained). The site controller 410 performs the regrouping process in three stages: (a) the "phase I" regrouping process (block 506); the "phase II" regrouping process (block 508); and a "bitmap handling" process (block 510). All three processes are typically performed simultaneously by site controller 410 in the preferred embodiment.

Referring now to FIG. 9 (the detailed flow chart of the "phase I" regroup process 506), site controller 410 in effect breaks down regroup requests by source groups from which the individual transceivers to be regrouped reside—as specified in the "home group ID" fields 1406 within queue elements 1402. That is, for "phase I" processing, controller 410 first contacts entire "source groups" of transceivers—some of the member transceivers of which may not be involved in the regrouping process, and then exchanges signals on a transceiver-by-transceiver basis with each transceiver to be regrouped. In the preferred embodiment, the "phase I" regroup process proceeds by calling all source groups (that is, groups normally resident on the communications system) from which individual transceivers are taken to form the new regroup and causing these source groups to monitor an alternate control channel temporarily; and then sending regroup messages (and receiving responses) over the alternate control channel to each individual transceiver to be in the new regroup.

Site controller 410 first determines whether any more source groups need to be contacted in order to form the new regroup (FIG. 9 decision block 514). Site controller 410 selects the "next" source group in the planned new regroup (block 516) and determines whether there are more than "x" (x=3 in the preferred embodiment) units in this source group (decision block 518). If more than x units are in the new regroup, site controller 410 executes the "phase I" regrouping process (FIG. 8 block 506, FIG. 9 blocks 520–530) involving an alternate control channel. On the other hand, messages to only "x" or fewer mobiles will not impose burdensome loading on the main control channel and may not justify the additional overhead required to perform "phase I" processing—and therefore, in the preferred embodiment, only the "phase II" (background) regrouping process is used for such small regroups (FIG. 8 block 508 and FIG. 12 blocks 532–538).

It should be noted that there are advantages to specifying large source groups. First, it is easier for the supervisor to build regrouping plans and visualize the plans when they are executed. Second, the regrouping process is not only faster but also more efficient if larger numbers of units to be regrouped can be handled simultaneously by the "phase I" portion of the process. In addition, there is a very subtle but important third advantage addressing the fact that regroup plans can't be independent of "shift"—that is, periods during the day and night when different personnel are working. Unfortunately, the world is not blessed with accidents that wait until the shift personnel stored in a particular plan are on duty. An emergency dynamic regroup plan must therefore be independent of shift. Achieving shift independence can be difficult if not impossible to achieve in practice, but the regrouping provided by the present invention can relieve the problem to some extent. Since the regrouping process can occur so quickly, any plan can include radios from multiple shifts. Within a short time of execution of the plan, the operator of system manager 416 can determine which radios have been regrouped and which radios are not present. Radios that have not responded to regroup messages (most likely because they are "off duty") can be interactively removed from the regroup plan.

If there are more than "x" units in the source group, "phase I" regrouping can proceed for that source group, and a channel assignment for the source group is transmitted over the main control channel—this channel assignment message specifying a free working channel (block 520). All mobile transceivers in the specified source group monitoring the main control channel respond to the group channel assignment message in the same way they respond to any routine group channel assignment message in the RF signalling protocol of system 100—except that in this case site controller brings up the free channel as an alternate control channel instead of as a working channel (FIG. 9, block 520). Site controller 410 merely controls the working channel trunking card (e.g., 402) associated with the free working channel to behave as a control channel trunking card rather than as a working channel trunking card (in the preferred embodiment, any trunking card can cause its associated repeater to act as the control channel repeater for "fail-soft" considerations—this feature of the system architecture is used to advantage in the phase I dynamic regroup process by simply reconfiguring a free working channel as an alternate control channel).

The alternate control channel activated by block 512 has all of the same signalling as the main system control channel—except that a certain bit sequence in periodically-transmitted control channel protocol is modified slightly on the alternate control channel so that mobile units can distinguish between an alternate control channel and the "real" control channel. Suppose, for example, that a mobile transceiver enters the geographical area served by a site (or is turned on) while an alternate control channel is activated, begins searching for the control channel and comes across the alternate control channel before it discovers the "real" control channel. In this situation, the mobile transceiver detects that even though the control channel it is monitoring "looks" like a control channel, the bit sequence corresponding to dynamic regrouping is present, and therefore the mobile transceiver continues scanning until it finds the main control channel.

Referring briefly to FIG. 10, mobile transceivers in the called source group respond to the channel assignment message issued by site controller 410 over the main control channel in the same way they respond to any routine group channel assignment message—by loading their internal frequency synthesizer with the appropriate frequency (block 704)—thereby retuning to the alternate control channel. The called source group transceivers then obtain synchronization with the "slotted" outgoing digital control channel signals site controller 410 causes to have transmitted over the alternate control channel (block 706) and decodes each outgoing alternate control channel message as it is transmitted (block 708). Meanwhile, after site controller 410 "collects" the source group containing transceivers to be regrouped onto the alternate control channel, it makes up to three attempts to contact each individual mobile transceiver to actually be regrouped.

It is an important feature of one aspect of the present invention that FIG. 9 block 520 causes all transceivers in a specific source group (even those that will not be dynamically regrouped) to begin monitoring an alternate control channel. Typically, only some and not all of the transceivers in a particular source group will actually be sent a dynamic regroup command by block 530. However, because of the rapid data transfer rate over the alternate control channel (which in the preferred embodiment carries no messages not needed for either the dynamic regroup process or for sustaining synchronization between the site and the mobile units in the source groups), dynamic regroup messages can be transmitted very rapidly over the alternate control channel—and because there are no contentions on the inbound control channel, transceivers can send acknowledgments just as rapidly. Using this technique, over thirty mobile transceivers per second can be "regrouped" via the "phase I" process 506 in the preferred embodiment—and thus, mobile transceivers not actually being regrouped but which are members of source group containing mobile units which are being regrouped are only taken away for normal communications for an instant (not long enough to interfere with any routine calls they might receive).

FIG. 9 decision block 522 tests whether three passes have been completed for each mobile transceiver to be regrouped. If three passes have not been completed for each transceiver, site controller 410 next determines whether all units to be regrouped from the source group have been processed (FIG. 9 decision block 524). If some units have not yet been "regrouped", then site controller 410 selects the next individual unit from the source group to be "processed" (block 526), and tests whether this unit has already sent an acknowledgement message over the alternate control channel (signifying that it has already received and processed the dynamic regroup message—as recorded by a bit in the unit control block field 1412 of associated queue element 1402) (block 528).

If the selected unit has not yet sent an acknowledgement, site controller 410 transmits a dynamic regroup outbound control channel message over the alternate control channel directed to that specific unit (block 530). The format of this outbound control channel dynamic regroup message was set forth previously, and includes a first message specifying the logical identification of the individual transceiver being regrouped and a second message specifying various parameters of the new regroup (e.g., regroup plan number, regroup type, group knob setting and identification of the regroup). Each mobile transceiver 150 is equipped with sufficient internal non-volatile memory space to store up to 8 regroups at a time (in the preferred embodiment all 8 regroups must be part of the same regroup plan).

Referring now again to FIG. 10 (a flow chart of exemplary program control steps performed by mobile transceivers 150 in the preferred embodiment to implement dynamic regrouping), when a mobile unit decodes a dynamic regroup command transmitted by FIG. 9 block 530 that specifies its own individual identification (FIG. 10 decision block 710), the transceiver stores the regroup information contained in the dynamic regroup message into an internal non-volatile memory (FIG. 10 block 712) and transmits a standard protocol acknowledgement message to the site (this acknowledgement message echoing the regroup parameters fields contained in the second message in the outbound control channel dynamic regroup message pair) (block 714). Site controller 410 awaits receipt of acknowledgement messages transmitted by block 714 (FIG. 11 block 801). When an acknowledgement message is received, site controller 410 finds the appropriate queue element 1402 shown in FIG. 5 corresponding to the specific mobile transceiver which has sent the acknowledgement (e.g., by locating the correct logical id field 1404 through a sort control block used to index the queue) (FIG. 11 block 802), changes the Unit Control Block bit 1412 in the appropriate queue element to reflect that the unit has responded to the regroup command (block 804), and returns to what it was previously doing (FIG. 11 blocks 801, 802, 804 may be performed on an "interrupt-driven" basis if desired).

All mobile transceivers in the source group continue to monitor the alternate control channel until site controller 410 causes a termination message to be transmitted over the alternate control channel (FIG. 9, block 532). In the preferred embodiment, this termination message is simply the standard "site id" message with the site id set to a specific value not used by any existing site in system 100 (e.g., Site ID=63). Hence, mobile units in the source group that are not being regrouped and mobile units that have already received a dynamic regroup message directed to them and acknowledged the message continue to monitor the alternate control channel in the preferred embodiment until a "site id" type termination message is transmitted by the site controller (FIG. 9, block 532) and received by the mobiles (FIG. 10, decision blocks 716, 718), at which time the mobiles return to the main control channel (FIG. 10 block 720) and monitor the main control channel in normal fashion to await receipt of call messages specifying either their "normal" groups (or a "regroup activation" bit map message if they have been reconfigured by block 712).

Referring once again to FIG. 9, blocks 522–530 are performed three times in the preferred embodiment for each mobile transceiver to be regrouped. That is, each transceiver to be reconfigured into the new regroup is sent an outbound control channel dynamic regroup message, after which site controller 410 waits briefly for an acknowledgement. If no acknowledgement is received within a certain time-out period, site controller 410 sends the mobile transceiver another outbound control channel dynamic regroup message and waits for an acknowledgement. If no acknowledgement is sent to the second message, the site controller 410 transmits a third dynamic regroup message to the mobile unit and waits for an acknowledgement. If no acknowledgement is received in response to this third dynamic regroup message, site controller 410 "gives up" attempting to dynamically regroup that specific mobile transceiver in the "phase I" process. Site controller 410 then releases the source group and the alternate control channel (e.g., by transmitting a terminate message as described, although it might also be possible to release the source group by transmitting a working channel assignment message specifying the main control channel if desired, or alternately, by simply "dropping" the alternate control channel and thereby causing the mobile transceivers to scan for the main control channel), and repeats block 514–530 for the next source group containing mobile units to be placed into the new regroup. Site controller 410 is capable of concurrently performing the "phase I" process 506. That is, multiple alternate control channels can be established simultaneously, and process 506 can be performed for different regroups simultaneously (or for different source groups for the same regroup simultaneously) using different alternate control channels if desired.

When all such source groups have been processed (as tested for by decision block 514), the "phase I" process has been completed, site controller 410 begins performing "normal" tasks (including "phase II" dynamic regrouping in the "background" over the main control channel).

Even after the "phase I" regroup process has completed, there may still be (and typically are) a few mobile transceivers that for various reasons have not yet been "regrouped". For example, FIG. 9 block 518 specifically avoids regrouping certain mobiles in "phase I"; and some mobile transceivers may not have been powered-on during the "phase I" regrouping process, while others may have been obstructed by a hill or a bridge from receiving "phase I" regroup messages intended for it. Even though redundancy is "built in" to the RF signalling protocol being used (e.g., after the channel assignment message is transmitted by FIG. 9 block 520 over the main control channel, it may be periodically retransmitted via subaudible signalling on the working channels and is repeated periodically over the main control channel to reach mobile transceivers that may have "missed" the first channel assignment message to permit "late entry"), some mobile transceivers that need to be regrouped may not be regrouped by the "phase I" regroup signalling transaction. "Phase II" regroup signalling over the main control channel is used to reach: (1) mobiles that are called to the alternate control channel but fail to respond and/or acknowledge regroup messages transmitted to them; and (2) mobiles from source groups containing fewer than a specified number of mobile transceivers needing to be regrouped.

FIG. 12 is a flow chart of exemplary program control steps performed by site controller 410 to implement the "phase II" dynamic regroup signalling process, and FIG. 13 is a flow chart of exemplary program control steps performed in the preferred embodiment by mobile transceivers 150 in response to "phase II" dynamic regrouping signalling.

Referring now particularly now to FIG. 12, site controller 410 (which is typically engaged in transmitting various different messages over the main control channel, including routine periodically-transmitted status messages and channel assignment messages for routine group and individual calls) determine whether any mobile units need to be regrouped using "phase II" signalling (this information may be obtained by searching through the queue 1400 for unresolved regroup requests (FIG. 12 decision block 533). If there are mobile units to regroup using "phase II" signalling, the "next" unit is selected (block 534) and the queue element 1402 corresponding to that unit is tested to determine whether the unit has already acknowledged a dynamic regroup message directed to it (decision block 536). If the unit has not yet acknowledged, a dynamic regroup outbound control channel message transmitted over the main control channel directed to the unit to be regrouped (block 538). In the preferred embodiment, this outbound control channel dynamic regroup message is identical to messages transmitted over the alternate control channel by FIG. 9 block 530—and mobile transceivers respond in the same manner as the transceivers do on the alternate control channel (see FIG. 10) by insuring the dynamic regroup message is intended for them, storing the regroup parameters in their internal memories, and transmitting acknowledgements to the site (FIG. 13, blocks 710a-714a). In the preferred embodiment, phase II signalling is performed indefinitely for all mobiles to be regrouped that do not respond (typically a relatively small number) until system manager 416 cancels the regroup requests as to those mobile transceivers.

The "phase II" process taking place on the main control channel adjusts the number of outbound dynamic regroup control channel messages based on system loading. If loading is light, there is no reason why several regrouping commands per second can't be issued. A system loading increases, the rate at which dynamic regroup control channel messages transmitted over the main control channel is decreased to avoid adverse impact on other system operations.

In accordance with an important feature of a further aspect of the invention, mobile transceivers "regrouped" as discussed above (that is, dynamically reconfigured during the "phase I" and "phase II" signalling processes) do not begin using the regroups dynamically allocated to them until they receive a further message to do so over the main control channel. Only upon the transmission of a regroup plan bit map message specifying activation of a particular plan previously made "resident" do all previously programmed transceivers in a particular regroup virtually instantaneously respond—all at essentially the same time—by activating the newly activated dynamic regroup. Immature groups are entirely avoided using this virtually instantaneous activation technique. In addition, even though it is desirable to transmit outbound control channel cancel dynamic regroup messages to individual transceivers and receive responsive positive acknowledgements in order to cancel (make non-resident) a resident dynamic regroup plan, it is possible in an emergency (or panic situation) to make a resident (active or inactive) regroup plan immediately inactive and non-resident by issuing a single outbound control channel bit map message specifying that the plan is non-resident.

Referring now to FIG. 8 block 510, around the time "phase I" signalling is occurring, site controller 410 performs a bit mask handling routine that issues updated bit map outbound control messages over the main control channel. As discussed previously, the system dynamic regroup plan bit map periodically transmitted over the main control channel notifies all mobile units on communications system 100 of the current status (resident and/or active) of up to sixteen different regroup plans. As soon as "phase I" signalling process 506 is performed for any (the first) regroup in a regroup "plan" (each plan may contain an arbitrary number of regroups in the preferred embodiment), site controller 410 must modify the bit plan map periodically transmitted over the main control channel to reflect that the new regroup plan has been made "resident" on system 100. The site controller 410 performs this updating merely by changing the appropriate "plan residency" bit in the regroup plan bit map to reflect that a new regroup plan has been made resident on system 100—and transmitting the updated bit map in a message over the outbound (main) control channel. When a mobile transceiver receives an outbound control channel regroup plan bit map message over the main control channel (block 716 of FIG. 14), it decodes the message and, if it stores any regroup plan parameters in its internal memory, it tests the plan residency bit(s) corresponding to the internal regroup plans it stores. If the resident bit in the received bit map corresponding to a particular plan stored in the internal memory is not set, the mobile transceiver autonomously purges the area of its internal memory storaging dynamic regroup parameters (decision block 718, block 720 of FIG. 14)—this purging process being relatively simple in the preferred embodiment because of the restraint that only one regroup plan can be resident in a given mobile at a given time. On the other hand, if the residency bit corresponding to an internally stored dynamic regroup plan is set (indicating that the plan is still or has become resident on system 100), the mobile transceiver retains the plan parameters in memory (block 722).

Mobile transceivers 150 also test the plan bit map to determine whether they should activate resident dynamic regroup plans. In accordance with an important feature of one aspect of the present invention, dynamic regroups may be "resident"but not yet "active". Referring briefly to FIG. 8, if system manager 416 commands that a formerly inactive resident regroup plan is to be made active (decision block 505), site controller 410 transmits an updated bit map message over the main control channel with both the "residency" and "active" bits for that regroup plan being set (block 511). When a mobile transceiver receives a plan bit map that specifies a particular plan (parameters of which are stored in its internal memory) as being both "resident" and "active", the transceiver activates the regroup plan (e.g., by responding to all channel assignment message calls issued on the main control channel corresponding to the regroup or regroups in the plan, by permitting the user to access the regroups in the plan that knob control settings specified by the regroup parameters, and in some cases, by forcing the transceiver to operate only on the regroup as specified by the "regroup type definition" issued as part of the dynamic regroup outbound control channel message making the regroup plan "resident") (decision block 724, block 726 of FIG. 14).

Similarly, site controller 410 can make a previously active regroup plan inactive by simply transmitting an updated bit map with the status bits corresponding to the regroup plan set to "resident" but "inactive". If a previously "active" regroup plan is deactivated, receiving mobile transceivers simply discontinue using the regroup plan parameters (e.g., by preventing the user from accessing the regroups via the group select knob, and by ignoring group call messages directed to the regroups) (FIG. 14, decision block 724, block 728). Significantly, the deactivated "plan" remains "resident" in the transceiver until the transceiver receives a further plan bit map specifying it should be made non-resident (and/or until the transceiver receives a cancel regroup command as will be explained)—so that multiple (and even alternate) regroup plans can be "resident" on system 100 simultaneously and system manager 416 can activate or deactivate regroup plans at will without the time delay involved in sending each individual transceiver to be regrouped new parameters.

Referring to FIG. 8 once again, cancelling a resident dynamic regroup plan can be performed in either of two ways. If a resident plan is to be cancelled (decision block 503), the system manager 416 can specify a non-emergency (more ordered) cancellation (decision block 504, blocks 506a–510a) or an emergency (decision block 504, block 510a) cancellation. In the non-emergency cancellation, the "phase I" and "phase II" steps shown in FIGS. 9–14 are performed just as for making a new plan resident—except that the channel assignment messages transmitted by block 520, FIG. 9 may be directed to the regroups instead of to the source groups (if the plan being cancelled is still active at time of cancellation)—and FIG. 9 block 530 and FIG. 12 block 538 transmit cancel regroup messages rather than dynamic regroup messages to individual transceivers. This non-emergency cancellation technique assures a positive acknowledgement from each mobile transceiver in response a cancel regroup message directed specifically to it (in response to which cancel regroup message the mobile transceiver erases the appropriate plan parameters from its internal memory rather than adding them as in FIG. 10 block 712, FIG. 13 block 712a). The "emergency" type cancellation uses an updated bit map message to control all transceivers in which a particular plan is "resident" to purge the dynamic regroup information from their internal memories.

In the event of a "fail soft" situation (see commonly assigned application Ser. No. 057,046 filed Jun. 3, 1987), the control channel trunking card sets a bit in the outbound control channel protocol to indicate that system 100 is in fail soft mode. Upon detection of this bit, all transceivers 150 in which a regroup plan is "resident" end "active" automatically override the dynamic regroup "regroup type" parameter transmitted as part of the dynamic regroup message making the plan resident—and set this parameter to "11" (optional select). In other words, all active regroups revert to a mode which allows users to optionally switch into and out of them whenever the system enters the "fail soft" mode. Meanwhile, the control channel trunking card is capable of handling calls to and from regrouped transceivers as well as "normal" transceiver groups when operating in fail soft mode—and is also capable of handling console commands to cancel regroup plans and transmit bit map messages making active plans non-resident. An acceptable mode of operation is thus provided even if site controller 10 fails at the time a regroup plan is only partially implemented.

SYSTEM MANAGER 416

System manager 416 plays an important role in controlling system 100 and is the portion of the communication system in the preferred embodiment which directs dynamic regrouping functions. System manager 416 also handles all of the alarm and control functions provided by ACU 600, and also receives notification of alarm and other error conditions generated by test unit 700 and power monitor unit 500. System manager 416 in the preferred embodiment is intended to be operated by the system manager operators—people who are responsible for the overall operation and maintenance of system 100.

Figure 4:
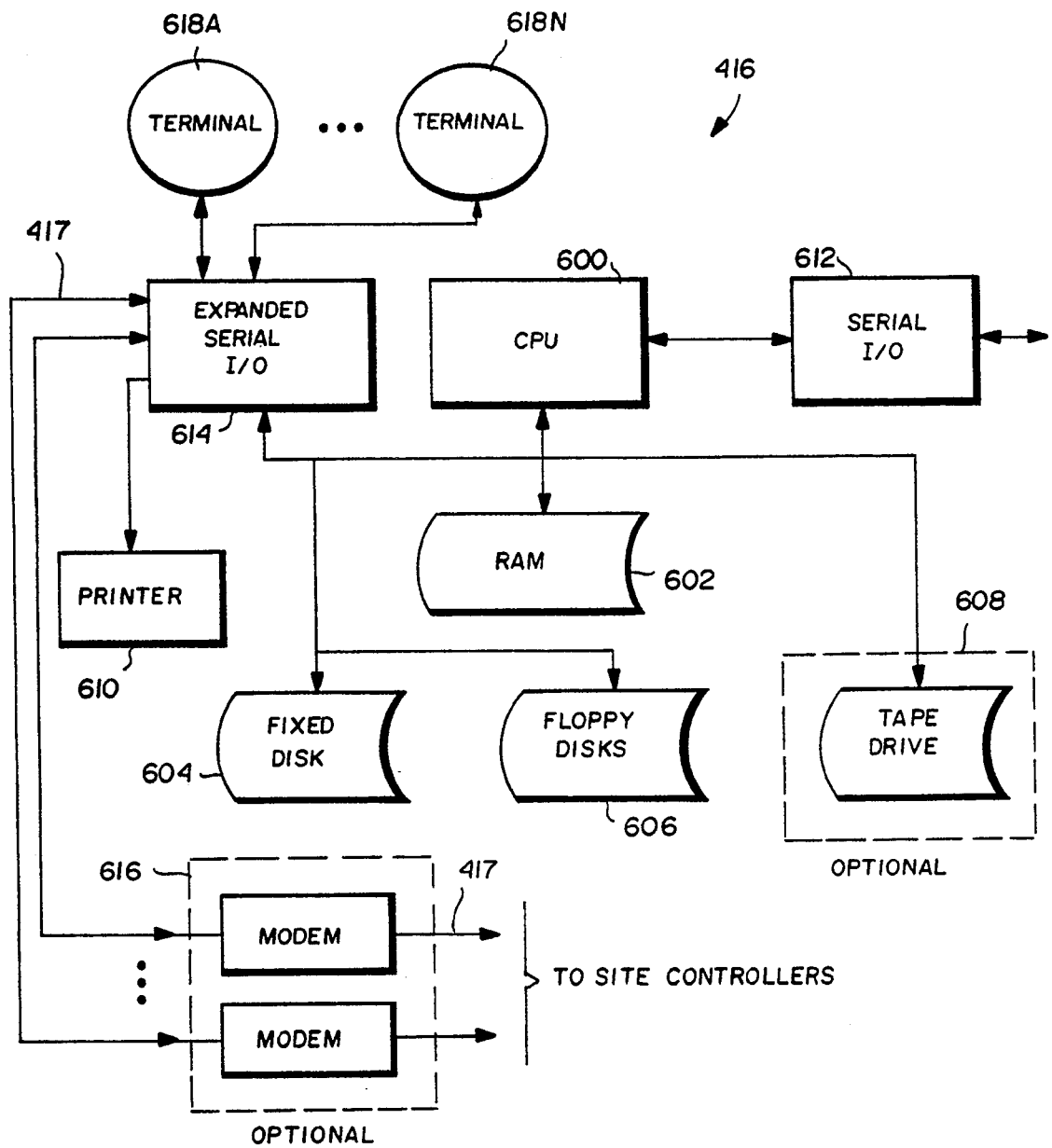
FIG. 4 is a detailed schematic block diagram of the system manager 416 shown in FIGS. 2 and 3.

FIG. 4 is a detailed schematic diagram of the structure of system manager 416. System manager 416 includes a central processing unit 600, a random access memory 602, a fixed disk 604, floppy disk drives 606, an optional tape drive 608, a printer 1610, a serial I/O interface 1612, an expanded serial I/O interface 614, serial modems 616, and one or more display terminals 618. Central processing unit 600 may be any desired conventional general purpose digital computer in the preferred embodiment (e.g., an IBM PC) connected to which is random access memory device 602, serial I/O interface 1612, 614, tape drive 608, fixed disk 604 and floppy disk drive 606. In the preferred embodiment, site controller 410 includes no hard disk drive, so that one of the responsibilities of system manager 416 is to store system parameters on fixed disk 604 and download those parameters to site controller 410 upon power-up of system 100.

CPU 600 communicates simultaneously with one or more display terminals 618 (each including the CRT display and a keyboard) via expanded serial I/O interface 614 (of conventional design). Printer 610 is provided to permit printing of a running log (or other desired reports) of system events. CPU 600 communicates with site controller 410 via a serial data link 417 (and communicates with a backup site controller via an additional serial data link). System manager 416 in the preferred embodiment is capable of managing plural sites simultaneously, and thus may be in contact simultaneously with several repeater sites. Modems 616 (of conventional design) may be provided to allow communication between the site controller 410 and system manager 416 over a conventional landline.

Some of the functions performed by system manager 416 in the preferred embodiment include:
 Dynamic Regroup Group and Plan Assignments;
 Dynamic Regroup Activation;
 Dynamic Regroup Deactivation; and
 Dynamic Regroup Site Coordination.

DYNAMIC REGROUP SYSTEM MANAGER USER INTERFACE

As mentioned, the dynamic regroup interface the preferred embodiment is used to plan in advance for situations that require units from various home groups be temporarily configured to a group(s) other than their home group. The configurations are then saved in destination group(s) under a plan name and can later be activated with a minimum number of keystrokes. A supervisor is able to activate from the plan level (which activates all destination groups under the plan) or from the destination group level (which only activates a single destination group at a time). The dynamic regroup function in the preferred embodiment provides:
 an unlimited number of plans up to disk storage capacity
 each plan can have many destination groups
 each destination group can identify many source groups from which the units are selected It is important for the dynamic regroup user interface to be easy to use and easy to understand. The preferred embodiment user interface uses menu driven software to present information to the user in an easily understandable and digestible format and to allow the user to simply and easily specify desired group configuration information.

In the preferred embodiment, the user interface consists of three "screens" or menus: the "main" screen; the "units" screen; and the "group" screen. The data is entered via the keyboard of one of terminals 618, and the various menus are displayed via the CRT of the terminal 618. Moving between screens as well as other operations can be specified via the function keys of the keyboard in the preferred embodiment.

An exemplary "main" screen format is shown below:

```
                    GE 16-PLUS TRUNKING SYSTEM
                         Dynamic Regroup Plan
                              Directory Plan : _____      Destination : _____    Source : _____
  Description : _____

Plans          |   Destination Groups    |   Source Groups
   ___  ___  ___       |   _____  _____        |   _____  _____
   ___  ___  ___       |   _____  _____        |   _____  _____
   ___  ___  ___       |   _____  _____        |   _____  _____

F6    F7     F8      F12      F14        DO      F17    F18
   EXIT  SAVE   DELETE  MODPCT   FRPSCREEN  SUBMIT  STOP   RESTART  REMOVE
```

The main screen consists of three "regions": the "plan" region, the "destination" group region, and the "source" group region. The "plan" region lists predefined dynamic regrouping plans available for execution. Each regroup plan specifies at least one (and typically more than one) new group in terms of the "normal" groups the mobile transceivers to be regrouped normally reside in (i.e., the "source" groups) and the new groups these mobiles are to be dynamically regrouped into (i.e., the "destination" groups, or "regroups"). In somewhat more detail, each plan consists of at least one destination group and at least one source group (each group can be a subfleet, a fleet or an agency). A "destination" group defines a new group into which radio transceivers are being dynamically regrouped (that is, a "regroup"). A "source" group is a group from which the mobile transceivers are being taken (i.e., a group in which the mobile transceivers "normally" reside). This concept of specifying dynamic regroups in terms of regroup plans each specifying a set of existing groups and new groups allows the user creating, activating or reviewing a regroup plan to keep an overall perspective (by maintaining a "top-down" approach, the user doesn't get lost in detail).

When the user selects a specific plan from the plan region of the main menu, a list of the destination groups in the plan appears in the destination region. If the user then selects one of the listed destination groups, the source groups used to "build" that destination group are listed in the source group region of the menu. By then selecting a specific source group from the list, the "units" screen appearing below is displayed:

Page 1 of 1    GE 16-PLUS TRUNKING SYSTEM
                  Dynamic Regroup Units          Current Mode: CREATE Regroup Plan: _____        Units from Source Group: _____
Destination Group: _____                Group Level: _____

Description: _____

| Unit | K | Unit | K | Unit | K | Unit | K | Unit | K | Unit | K |
|------|---|------|---|------|---|------|---|------|---|------|---|
| __ | _ | __ | _ | __ | _ | __ | _ | __ | _ | __ | _ |
| __ | _ | __ | _ | __ | _ | __ | _ | __ | _ | __ | _ |
| __ | _ | __ | _ | __ | _ | __ | _ | __ | _ | __ | _ |

Percentage Required: ____  Complete: 0___
Critical Unit Count: 0___  Resolved: 0___

F6   F7   F9   F10   F11   F12   F14   F17   F18   F19   F20
EXIT SAVE NXTGRP NEWPG MODCRIT CRITICAL SELALL STATUS KNOB/SEL PURGE MORE

The "units" screen lists all of the units in the specified source group that are to be extracted from the source group and dynamically regrouped into the destination group.

If a new source group is selected on the main screen (e.g., when a plan is being created or modified), all of the units associated with the selected source group are listed on the units screen—and the operator can then select which units he desires to include in the destination group. Once the operator completes his selection of desired units, system manager 416 automatically purges unselected units and alphabetizes the list (if a source group already specified in a plan is displayed, the units included in this displayed source group are listed in alphabetical order). New units can be added or existing units easily deleted using this same unit screen.

Specifying individual mobile transceivers in terms of the source group they are normally included within reduces the level of user complexity and permits the user to specify dynamic regroup plans in a natural manner—and also has an impact on the way dynamic regrouping is activated.

Some of the function keys displayed at the bottom of the units screen can be used to toggle the "K" field between "K" (knob setting), "T" (type of regroup), and "S" (status). Since some radios need to be programmed with multiple new groups, the ability to specify the regroup's knob setting eliminates ambiguity or conflicts. In the preferred embodiment, new groups specified using the dynamic regrouping feature do not replace existing groups in a radio transceiver, but rather are positioned "below" them on the transceiver channel selection knob/display. Suppose, for example, that a mobile radio transceiver is set to group 1. If the transceiver user selects the next "higher" group by clicking his channel selection knob one position to the right, the transceiver will begin operating in the next higher "normal" group. If, on the other hand, the transceiver user selects a "lower" (i.e., left-hand position) group, the transceiver will begin operating on the "highest" regroup programmed into the radio. Turning the channel selection knob an additional position to the left selects the next "lower" regroup, this selection continuing until all "regroups" associated with group "1" have been selected and the highest "normal" group is reached. Regroups are distinguished from "normal" groups on transceiver digital displays by displaying the "0" in the first digit position. For example, if a radio transceiver is programmed with "normal" groups "1", "2" and "23" and the radio is regrouped with two regroups, one with the knob setting "01" and the other with the knob setting "05", the sequence of groups as accessible from the group select control knob would be "01", "05", "1", "2" and "23" (in that order as the knob is turned from left to right in the preferred embodiment).

The "type" setting specifies whether the radio should or should not be forced to join a dynamically allocated group and whether or not the user can override the regroup command if he desires. There are four possible values for this "type" setting in the preferred embodiment:

(a) the regrouped transceivers is forced to a regroup and cannot deselect the regroup,
(b) the regrouped transceiver is forced to a regroup but can deselect the regroup and use another group,
(c) the regrouped transceiver can freely select and deselect the regroup; and
(d) the regrouped transceiver is not forced into the regroup, but if the transceiver user selects the regroup the transceiver is forced to remain on the regrouping. The system manager user can change any of the four "type" settings on a unit-by-unit and regroup-by-regroup basis.

The "status" field is used when a regrouping plan is active to indicate whether or not a radio transceiver has actually been regrouped or whether the regroup request is pending as to it (e.g., the unit has not yet been located so it is not yet regrouped). This status field thus allows the system manager operator to interactively monitor regrouping as it progresses.

The preferred embodiment also permits the supervisor to specify not only what units will be regrouped into specific destination groups, but also the identification of the destination group. This additional information is specified by using the "group" screen shown below:

GE 16-PLUS TRUNKING SYSTEM
Dynamic Regroup Define Screen

Plan Name   : _____   Dest. Group: _____   Percent Req. : 100
Description : _____

```
Agency Number    : __        Fleet Number: ____    Subfleet Number: _____
Record Type      : _____
Console Name     : _____       Console Bay Number: __  Console Module: __

(Division)       : _____
(Name)           : _____
(Street)         : _____
(City)           : _____        (State) : __   (ZIP) : _____
(Phone Number)   : _____
  Priority       : __                              (Hang Time) : __
                              111111111122222222222333
Site Number      1234567890123456789012345678901 2
Active (Y)       : _____

F6      F7      F10
EXIT    SAVE    CLEAR
```

By specifying the destination group and striking the "group" function key, the group screen is displayed. This group screen lists the name of the plan and the name of the destination group (regroup) and allows the user to input information identifying the regroup (e.g., agency, fleet or subfleet). The priority and hang time to be associated with a regroup may also be specified, in addition to "percent required" and "critical unit" information which permits a new group to become active only when a specified percentage of total units in the designation group and all units designated to be critical to the regroup have actually been regrouped.

The procedure for defining a regroup plan may proceed as follows:

1. Decide which units need to be included in the plan. If a number of units are in the same home group(s), record the home group name(s). These home group names are the source groups. The names of all units in the source group will be generated by the system on the units screen. The user is able to edit the source group unit by unit, so it is not necessary that a home group be identical to the source group.
2. List the names of any units that are to be included in the plan that do not appear in any common home group.
3. Decide on the number of destination groups ("regroups") for the plan and give a unique destination group name (up to 8 characters) to each one. List the home group names in step 1 and the units in step 2 in order of which ones you want to be able to activate together under a destination group name.
4. If any destination group has only names from step 2 and no home group names from step 1, write the word INDIVIDL under the destination group name. INDIVIDL is the source group name for this list. When setting up the plan, you will have to type each individual unit name only for individual units that don't appear in any common home group on this list on a screen under the INDIVIDL source group name.

The attached Appendix A sets forth specific exemplary operator instructions for interacting with one version of the menu driven software executed by system manager 416 in the preferred embodiment.

SYSTEM MANAGER MESSAGE FORMATS

The following describes exemplary messages and message conventions communicated between system manager 416 and site controller 410.

MESSAGE PROTOCOL

Messages are transmitted between system manager 416 and site controller 410 in 8-bit data packets delimited by frame start characters and checksum characters. Each packet starts with a frame byte character of 0AA hex. The internal structure of a packet is as follows:

ff tt dd dd dd ... dd cc where ff is the frame sync character (0AA hex),
tt is the message type byte (which defines the content of the message),
dd are data bytes, and
cc is a checksum (formed by taking the exclusive OR of each byte in the message, starting with the message ID byte, and then negating the result).

ACKNOWLEDGEMENT RULES

Any valid message received is acknowledged. A valid message is defined as one in which the checksum of the data bytes matches the checksum transmitted. If a packet is received but has an invalid checksum, a negative acknowledgement (NACK) is sent.

Messages are transmitted singly threaded, waiting for an acknowledgement before sending the next message. Receiving a negative acknowledgement results in immediate retransmission of the packet. If an acknowledgement is not received within two seconds, the same message is retransmitted. Retransmission should occur three times before erroring out.

An acknowledgement message has the following form:
  ff   AA
  tt   00
  cc   FF   (checksum of 00)
A negative acknowledgement message has the following form:
  ff   AA
  tt   FF
  cc   00

FIG. 15 is a flowchart of exemplary program control steps performed by both system manager 416 and site controller 410 to transfer messages in the format above between the two of them.

SYSTEM MANAGER TO SITE CONTROLLER MESSAGES

The following describes exemplary messages used to communicate dynamic regrouping commands and information from the system manager to site controllers in the preferred embodiment.

REGROUP BUFFER REQUEST—MESSAGE TYPE 37

The regroup buffer request is implemented to allocate/extend a dynamic regroup control buffer from the site controller. When received, the site controller will scan the regroup control blocks (RCB) for a-match of the destination group id. Providing no match is found and the appropriate buffer space is available, the site controller will create an RCB for the specified destination group id. However, if there is a positive match between the destination group id and an RCB, the site controller will extend the buffer space available for that regroup.

A response from the site controller is generated from reception of this command.

| | |
|---|---|
| : .MM. | Message type (37) |
| : .D1. : .D2. . | Destination group id (0-2048) |
| : .D3. : .D4. . | Number of units to be regrouped (0-1024) |
| : .D5. . | Regroup qualifier |

Regroup Qualifier

| B7 | B6 | B5 | B4 | B3 | B2 | B1 | B0 |
|---|---|---|---|---|---|---|---|
| Plan number for regroup | | | | Not used | Fleet Decode Field | | |

Fleet decode field contains the number of bits required by the mobile to properly decode the fleet. Plan number is the number used in the regroup commands.

SUBMIT COMMAND—MESSAGE TYPE 38

The purpose of the submit command is to place the specified unit into the regroup control buffer identified in the destination group id.

| | |
|---|---|
| : .MM. | Message type (38) |
| : .D1. : .D2. . | Destination group id (0-2048) |
| : .D3. : .D4. . | Home group id (0-2048) |
| : .D5. : .D6. . | Logical id (0-16383) |
| : .D7. . | Request qualifier (see below) |
| : .D8. . | Status qualifier (see below) |

Request Qualifier

| B7 | B6 | B5 | B4 | B3 | B2 | B1 | B0 |
|---|---|---|---|---|---|---|---|
| Unused | | | Type Request | | Group Knob Setting | | |

Type request:
00 → Forced select, no deselect
01 → Forced select, optional deselect
10 → Undefined
11 → Optional select
Group knob setting:
0 . . . 7 Associates regroup with group knob setting Status Qualifier

| B7 | B6 | B5 | B4 | B3 | B2 | B1 | B0 |
|---|---|---|---|---|---|---|---|
| A | B | C | D | E | Unused | | |

A active pending; B active; C cancel pending; D cancelled; E report status—(must be cleared when resolving units)

START REGROUP REQUEST—MESSAGE TYPE 39

A start regroup request is issued to initiate the regroup process. Once issued, the site controller will attempt to regroup all units in the specified buffer until (1) all units have been regrouped or (2) a discontinue regroup command is received.

The retry count identifies the number of attempts to make before reporting the status back to the system manager. A start regroup request with a retry count of zero is decoded as a discontinue/halt regroup command. When received, regroup processing is discontinued until resumed. Buffer contents remain the same.

| | |
|---|---|
| : .MM. | Message type (39) |
| : .D1. .D2. . | Destination group id (0-2048) |
| : .D3. . | Report count (0-255) |
| : .D4. . | Regroup status (see below) |

Regroup Status

| B7 | B6 | B5 | B4 | B3 | B2 | B1 | B0 |
|---|---|---|---|---|---|---|---|
| Unused | | | | | | | A |

A) process foreground flag

1 ——→ process foreground

STATUS FEEDBACK REQUEST—MESSAGE TYPE 3A

This command is used to request a list of all units that have acknowledged the specified regroup. Once this command is received and decoded by the site controller, a stream of status feedback responses will be sent identifying units that have acknowledged the regroup.

| | |
|---|---|
| : .MM. . | Message type (3A) |
| : .D1. : .D2. . | Destination group id (0-2048) |

DELETE BUFFER COMMAND—MESSAGE TYPE 38

The primary purpose of this command is to free up regroup buffer space in the site. This command gives the system manager the option of deleting a single element or deleting the entire group. If the delete qualifier contains a zero, the unit specified in the logical id field will be deleted. If the delete qualifier is a one, the entire regroup buffer will be deleted.

| | |
|---|---|
| : .MM. | Message type (41) |
| : .D1. : .D2. . | Destination group id (0-2048) |
| : .D3. : .D4. . | Home group (0-2048) |
| : .D5. : .D6. . | Logical id (0-2048) |
| : .D7. . | Deletet qualifier (see below) |

| B7 | B6 | B5 | B4 | B3 | B2 | B1 | B0 |
|---|---|---|---|---|---|---|---|
| Unused | | | | | | | A |

A) Delete qualifier:
0 ——→Individual unit delete
1 ——→Regroup delete

PLAN LEVEL BIT MAP (FOR PLAN NUMBER X)—MESSAGE TYPE 16

Used to tell the site controller (which then tells the control channel) the state of each plan in the system. All plans are assumed to be not resident and not active initially.

| | |
|---|---|
| : .MM. | Message type (22) |
| : .D1. . . | Plan number and bit states |

Plan Number and Bit States - Layout

-continued

| B7 | B6 | B5 | B4 | B3 | B2 | B1 | B0 |
|---|---|---|---|---|---|---|---|
| Unused | Active bit state | | Resident bit state | | Plan number (0-15) | | |

SITE CONTROLLER TO SYSTEM MANAGER MESSAGES

The following are exemplary formats of messages used to communicate dynamic regrouping information from the site to the system manager.

REGROUP REQUEST RESPONSE—MESSAGE TYPE 37

This command is sent in response to a regroup buffer request. If the buffer space requested is available, the site controller will allocate the space requested and report the remaining space allotment. If the requested buffer space is not available, the site controller will utilize this command to report the remaining space allotment.

| | |
|---|---|
| MM | Message type (37) |
| D1 D2 | Destination group id (0-2048) |
| D3 D4 | Number of elements available (0-1024) |
| D5 | Ack/Nak (0-255) |

START REGROUP REQUEST RESPONSE—MESSAGE TYPE 39

Upon receiving a start/initiate regroup request, this command will be issued to acknowledge reception of the command and confirmation of the regroup id.

| | |
|---|---|
| MM | Message type (39) |
| D1 D2 | Destination group id (0-2048) |
| D3 | Ack/Nak (0-255) |

STATUS FEEDBACK RESPONSE—MESSAGE TYPE 3A

The site controller will issue this command to alert the system manager that a regroup (pass) has been completed on the group identified in the destination group id field. The system manager will then use the information contained (group id) to issue a status feedback request. When the request is received, the site controller will utilize this command to report back to the system manager the unit that has acknowledged the regroup request.

| | |
|---|---|
| MM | Message type (3A) |
| D1 D2 | Destination group id (0-2048) |
| D3 D4 | Logical id (0-16383) |
| D5 | Unit status (see below) |

Unit Status

-continued

| B7 | B6 | B5 | B4 | B3 | B2 | B1 | B0 |
|---|---|---|---|---|---|---|---|
| A | B | C | D | E | | Unused | |

A active pending; B active; C cancel pending;
D cancelled; E report status - (must be cleared when resolving units)

INTERACTION BETWEEN SITE CONTROLLER AND SYSTEM MANAGER

The techniques by which regroup plan parameters are interactively inputted and displayed by system manager 416 have already been described. The interactive software used to perform these display, input and data storage functions are menu-driven modules that result in storing the inputted parameters in disk files on system manager fixed disk 604. When the operator of system manager 604 issues a command to make a dynamic regroup plan (or a particular destination group from plan) "resident", system manager 416 issues a "regroup buffer request" message to each site controller 410 of system 100 at high speed over landland links in the preferred embodiment (FIG. 16 block 902). The regroup buffer request command causes each site controller 410 in communication with system manager 416 (the system manager is typically in communication simultaneously with all site controllers in a multiple site system) to allocate and/or extend its regroup control block 1420 to add additional queue elements 1422 corresponding to regroups in the regroup plan to be made resident.

When site controller 410 receives this regroup buffer request, it scans its regroup control block 1420 to determine whether there are any records 1422 with a matching destination group identification field 1424. If no match is found in the appropriate buffer space, the site controller creates a new record 1422 with the specified destination group. If there is a record already existing specifying that regroup, on the other hand, site controller 410 extends the buffer space available for that regroup. Site controller 410 then responds by generating the "regroup request response" message which acknowledges receipt of the request and reports remaining space allotted to the buffer 1420.

System manager 416 may then submit commands to various sites by transmitting "submit command" messages (FIG. 16 block 904). Each "submit command" specifies an individual transceiver to be regrouped into a new or existing plan. Site controllers 410 receiving "submit command" messages from system manager 416 add records to queue 1402 corresponding to units specified by the submit commands—ensuring that the records created in buffer 1420 corresponding to the regroup are updated to point into queue 1400 and also ensuring that queue 1400 home group id fields 1406 reflect the proper regroup (and, of course, also ensuring that duplicate queue elements are not created). Since system manager 416 generally has no way to tell what sites are serving particular units to be regrouped, the system manager transmits the submit command messages to all sites (or to particular multiple or single sites if the unit can be guaranteed to be operating within a subset of possible sites) to thereby automatically permit "searching" for mobile units during the course of normal dynamic regroup phase I and phase II signalling.

When all individual mobile units to be regrouped have been specified by "submit command" messages, system manager 416 may initiate the regrouping process by issuing a "start regroup request" message to all sites (FIG. 16 block 906). Site controller 410 updates retry count field 1432 of the appropriate record 1422 in regroup control buffer 1420 in response to the "start regroup request" message and issues a "start regroup response" message back to system manager 416 positively acknowledging receipt of the "start regroup request" message. Site controller 416 then begins performing the main regrouping routine shown in FIG. 8 and discussed previously, and continues to perform this routine for the specified regroup until all units have been regrouped or until system manager 416 issues a discontinue regroup command.

In the preferred embodiment, site controller 410 operates on the regroup level rather than on the plan level. That is, site controller 410 is only responsible for making regroups—and not entire plans—resident or active. System manager 416 provides the coordination in the preferred embodiment to permit activation on the regroup plan level (e.g., by issuing multiple start regroup request messages—one for each regroup in a particular plan), and also for coordinating between sites.

Periodically during the regrouping process (and at any time upon the request of an operator of system manager 416), the system manager may issue a "status feedback request" message to request a list of all units that have acknowledged in the specified regroup (block 908)—anbd in which the regroup is therefore resident—from each site. In response to receipt of a "status feedback request" message, site controller 410 transmits a "status feedback response" message—a stream of status feedback responses identifying individual units that have acknowledged outbound control channel dynamic regroup messages. In the preferred embodiment, site controller 410 obtains this information by simply transmitting a list of all units in queue 1400 corresponding to particular regroup with status fields 1410 indicating that the unit has acknowledged. When system manager 416 receives this information, it resolves units from different sites (block 910) to prevent one site from continuing to attempt to regroup units that have already been regrouped by other sites. For example, if system manager 416 receives a "status feedback response" message from site A stating that a particular mobile unit has acknowledged a dynamic regroup message, the system manager transmits "delete buffer command" messages to all other sites specifying that individual unit—thus preventing the other sites continuing to attempt to regroup that unit (block 912).

The status feedback response messages returned by site controllers 410 to system manager 416 are also used by the system manager to update its "units" screen to indicate whether individual units have or have-not been "regrouped". The operator of system manager 416 may monitor this unit screen and watch as the status of different units change from "not yet regrouped" to "regrouped".

System manager 416 also maintains a current disk file listing of all units that have been regrouped in a particular regroup, and periodically tests this listing against the "percentage required" and "critical unit count" information specified at the time the regroup was specified. The most current results of this comparison are displayed on the "units screen" When this stored list of acknowledged units in a specific regroup contain both (a) the requisite percentage of units and (b) the requisite specific critical units needed to make the regroup effective, system manager 416 may automatically issue an updated plan level bit map message to inform all site controllers of the state of all plans on system 100—and specifying an active status for regroup (or the operator of system manager 416 can override the percentage/critical unit defaults at any time to force such a message to be generated). The effect of this bit map message command is to activate the regroup on system 100 in the manner explained above in connection with FIG. 14.

System manager 416 may deactivate an active regroup by issuing a further updated plan level bit map specifying a particular regroup is to be inactive (or inactive or non-resident). The effect of this further command is to cause all site controllers to issue modify dynamic regroup bit map messages—and ultimately, to cause all mobile radios to autonomously respond by deactivating and/or making non-resident plans specified in the bit map information. This type of deactivation can be used in a "panic" situation or in an emergency (e.g., to immediately abort a regroup plan having unexpected results or for some reason interfering with critical communications), although the "normal" method of making resident regroups non-resident is to perform steps 902–912—except that system manager 416 issues "submit command" messages with "status qualifier" fields specifying "cancel" rather than "active pending" status. All of the same steps (including acknowledgements) performed by site controllers 410 and mobile transceivers 150 to make a regroup plan resident are then performed to make the regroup plan "non-resident".

In addition, system manager 416 maintains an historical dynamic regroup bit map including the sixteen most recently resident regroup plans (with all non-resident plans having both resident and active bit unset) so that, for example, any mobile transceiver that was powered-off or removed from the coverage of communications system 100 at the time a regroup was active will, upon locking onto the system control channel, soon make the plan (which should still be resident in its internal memory) non-resident in response to a bit map message on the outbound control channel. New plans are assigned arbitrary "plan numbers" (0–16) for purposes of the outbound control channel bit map messages (and dynamic regroup messages)—with new plan numbers being assigned to overlay the oldest deactivated plan (so that the historical deactivation data stays in the system as long as possible).

SAMPLE COMMUNICATION SESSIONS

The following chart describes sample communication exchanges between the system manager and the site controller in the preferred embodiment for initiating a sample dynamic regrouping process:

| System Manager | Site Controller |
| --- | --- |
| Regroup buffer request → | |
| | ← Regroup buffer response |
| Submit command → | |
| Submit command → | |
| . | |
| . | |
| . | |
| Submit command → | |
| Start regroup request → | |
| | ← Start regroup response |

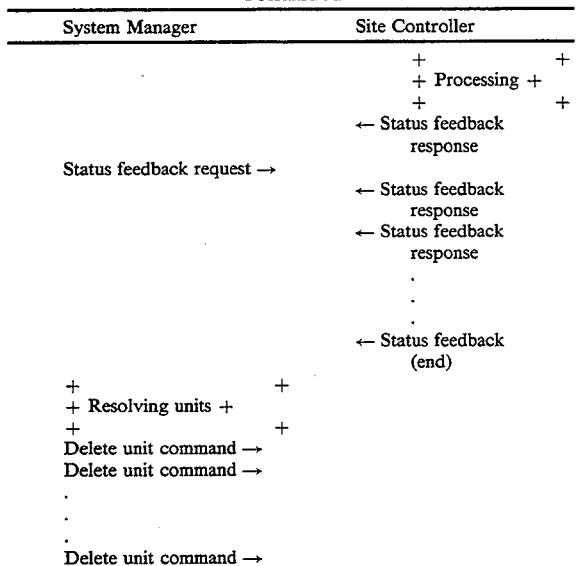

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of dynamically regrouping radio transceivers in a trunked radio communications system having a digital RF control channel and also having at least one further RF channel for temporary use by said radio transceivers, said method including:
   transmitting at least one message over said digital RF control channel directing said radio transceivers to said further RF channel;
   transmitting a dynamic regroup message to said radio transceivers over said further RF channel, said dynamic regroup message specifying a group identification; and
   dynamically programming, in response at least in part to receipt of said transmitted dynamic regroup message, said radio transceivers to respond to transmission of a message containing said group identification by said trunked radio communications system.

2. A method of dynamically regrouping radio transceivers in a trunked radio communications system having a digital RF control channel and at least one RF working channel, said method including:
   generating a dynamic regroup message including: (i) a group identification, and (ii) a regroup type definition field;
   communicating said dynamic regroup message to said radio transceivers over said RF working channel;
   storing said group identification in each said radio transceiver in response to said communicated dynamic regroup message; and
   automatically selectively preventing operators of said radio transceivers from manually disabling said radio transceivers from responding to said group identification in response to said regroup type definition field.

3. A method as in claim 2 further including the step of automatically selectively initially selecting said group specified by said dynamic regroup message in response to said regroup type definition field.

4. A method of dynamically regrouping radio transceivers in a trunked radio communications system having a digital RF control channel and at least one further RF channel capable of being temporarily assigned for use by said radio transceivers, said radio transceivers having user control settings, said method including:
   generating a dynamic regroup message including: (i) a group identification, and (ii) a regroup type definition field;
   communicating said dynamic regroup message to said radio transceivers over said further RF channel;
   storing said group identification into said radio transceivers in response to said communicated dynamic regroup message; and
   selectively controlling said radio transceivers to respond to said group identification regardless of the state of said radio transceiver user control settings depending upon the contents of said regroup type definition field.

5. A method of dynamically regrouping radio transceivers in a trunked radio communications system having a digital RF control channel and at least one further RF channel capable of being assigned for temporary use by said radio transceivers, said method including
   specifying a dynamic regrouping plan;
   storing indicia of said specified dynamic regrouping plan; and
   subsequent to said storing step, implementing said dynamic regroup plan by:
   transmitting, in response to said stored indicia, at least one message over said digital RF control channel directing said radio transceivers to said further RF channel, and
   transmitting a dynamic regroup message to said radio transceivers over said further RF channel, said dynamic regroup message specifying a group identification, said transmitted dynamic regroup message dynamically controlling said radio transceivers to respond to said group identification.

6. A method of claim 5 wherein:
   said specifying step includes specifying a plan number;
   said implementing step further includes specifying said plane number; and
   said dynamic regroup message transmitting step includes the step of transmitting said plane number as a part of said dynamic regroup message.

7. A method of dynamically regrouping a radio transceiver in a trunked radio communications system having a digital RF control channel and at least one further RF channel capable of being assigned for temporary use by said radio transceiver, said method including:
   (a) receiving, at said radio transceiver, a dynamic regroup message including a radio identifying code over at least one of (a) said RF control channel, and (b) said further RF channel, said dynamic regroup message indicating a group identification;
   (b) storing said radio identifying code at said radio transceiver;
   (c) subsequently to said receiving step (a) and said storing step (b) receiving a dynamic regroup activate message transmitted over at least one of (a) said RF control channel, and (b) said further RF channel; and (d) delaying activation of said stored radio identifying code at least until receipt of said dynamic regroup activate message.

8. A method of dynamically regrouping a radio transceiver in a trunked radio communications system having a digital RF control channel and at least one further RF channel capable of being assigned for temporary use by said radio transceiver said method including:
  (a) receiving, at said radio transceiver, a dynamic regroup message over at least one of (a) said RF control channel, and (b) said further RF channel, said dynamic regroup message indicating a group identification;
  (b) subsequent to said receiving step (a) further dynamic regroup activate message transmitted over at least one of (a) said RF control channel, and (b) said further RF channel; and
  (d) begin using said group identification in response to receipt of said further message;
  wherein said method further includes the preliminary step of transmitting a channel assignment message over said RF control channel directing said radio transceiver to said further RF channel so as to permit said radio transceiver to receive said dynamic regroup message over said further RF channel, and
  said receiving step (a) comprises the step of receiving said dynamic regroup message transmitted over said further RF channel.

9. A method of dynamically regrouping plural radio transceivers in a trunked radio communications system having a digital RF control channel and at least one further RF channel capable of being assigned for temporary use by said radio transceivers, said method including:
  (a) transmitting, over said trunked radio system to said plural radio transceivers, at least one dynamic regroup message specifying a regroup;
  (b) making said regroup resident within said radio transceivers at least in part in response to receipt of said dynamic regroup message;
  (c) subsequently to said step (b), transmitting a regroup activate message over said trunked radio system to said radio transceivers; and
  (d) delaying activation of said resident regroup at least until receipt of said regroup activate message by said radio transceivers.

10. A method of dynamically reprogramming radio transceivers over the air in a trunked radio communications system including at least one mobile radio transceiver, said mobile radio transceiver having a memory device providing at least first and second storage locations, said method including:
  receiving, over the air with said mobile radio transceiver, a first dynamic regroup identification;
  storing said first regroup identification in said first storage location provided by said memory device in response to receipt of said first dynamic regroup message;
  receiving, over the air with said mobile radio transceiver, a second regroup identification different from said first regroup identification;
  storing said second regroup identification in said second storage location provided by said memory device in response to receipt of said second dynamic regroup message; and
  responding to calls directed to any of said first and second regroups at least in part in response to said stored first and second regroup identifications.

11. A method of dynamically reprogramming radio transceivers over the air in a trunked radio communications system including at least one mobile radio transceiver, said mobile radio transceiver having a memory device providing at least first, second and third storage locations, said third storage location storing a permanent group identification that is not capable of being overwritten in response to receipt of messages over the air, said method including:
  receiving, over the air with said mobile radio transceiver, a first dynamic regroup message specifying a corresponding first regroup identification;
  storing said first regroup identification in said first storage location provided by said memory device in response to receipt of said first dynamic regroup message;
  receiving, over the air with said mobile radio transceiver, a second dynamic regroup message specifying a corresponding second regroup identification;
  storing said second regroup identification in said second storage location provided by said memory device in response to receipt of said second dynamic regroup message; and
  responding to calls directed to any of said first and second regroups and said permanent group at least in part in response to said stored first and second regroup identifications and said permanent group identification.

12. A method of dynamic regrouping in a trunked radio communication system including at least one mobile transceiver, said method comprising:
  transmitting plural dynamic regroup identifications over the air,
  storing said plural dynamic regroup identifications within said mobile transceiver; and
  selectively activating at least one of said stored plural dynamic regroup identifications, including the step of delaying said activation at least until receipt by said mobile transceiver of a further over-the-air message.

13. A method as in claim 12 wherein said transmitting step comprises transmitting N regroup identifications, and wherein said selectively activating step comprises transmitting a broadcasted over-the-air digital message having at least N bits, each of said N bits indicating the status of a different one of said N regroup identifications.

14. A method of dynamic regrouping in a trunked radio communication system including plural mobile transceivers, said method comprising:
  transmitting at least one dynamic regroup message over the air so as to make said regroup resident within each of said plural mobile transceivers;
  subsequently transmitting a regroup activate message over the air; and
  substantially simultaneously activating said regroup at each of said plural mobile transceivers no earlier than transmission of said regroup activate message.

15. A method of dynamic regrouping in a trunked radio communication system including first and second mobile transceivers, said method comprising:
  transmitting a first dynamic regroup message over the air to said first mobile radio transceiver so as to make said regroup resident within said first mobile transceiver;

transmitting a second dynamic regroup message over the air to said second mobile radio transceiver so as to make said regroup resident within said second mobile transceiver; and subsequently transmitting a further message over the air to both said first and second mobile transceivers so as to substantially simultaneously activate said regroup at each of said first and second mobile transceivers.

16. A method of dynamic regrouping in a trunked radio communication system including first and second mobile transceivers, said method comprising:
 (1) receiving a first dynamic regroup message over the air with said first mobile radio transceiver;
 (2) making said regroup resident within said first mobile transceiver in response to receipt of said first message;
 (3) receiving a second dynamic regroup message over the air to said second mobile radio transceiver;
 (4) making said regroup resident within said second mobile transceiver in response to receipt of said second message;
 (5) subsequently to said making steps (2) and (4), substantially simultaneously activating said regroup at each of said first and second mobile transceivers.

17. A method as in claim 16 wherein said activating step includes the steps of:
 receiving a regroup activation message at each of said first and second mobile transceivers; and p1 activating said regroup at each of said first and second mobile transceivers in response to said receipt of said regroup activation message.

18. A method of dynamic regrouping in a trunked radio communication system including first and second mobile transceivers, said method comprising:
 receiving a first dynamic regroup message over the air with said first mobile radio transceiver;
 making said regroup resident within said first mobile transceiver in response to receipt of said first message;
 receiving a second dynamic regroup message over the air to said second mobile radio transceiver;
 making said regroup resident within said second mobile transceiver in response to receipt of said second message;
 subsequently substantially simultaneously activating said regroup at each of said first and second mobile transceivers,
 wherein said system includes an RF control channel and at least one further channel, and wherein:
 said method further includes transmitting each of said first and second dynamic regroup messages over said further channel; and
 said activating step includes the step of transmitting a regroup activate message over said control channel.

19. In a trunked radio communications system having at least one mobile radio transceiver, a method of dynamically regrouping comprising:
 providing at least one stored dynamic regroup code within said mobile radio transceiver;
 receiving an activation message with said mobile radio transceiver over the air; and
 activating said stored dynamic regroup code no earlier than receipt of said activation message.

* * * * *

UNITED STATES PATENT AND TRADEMARK OFFICE
CERTIFICATE OF CORRECTION

PATENT NO. : 5,369,783
DATED : 29 November 1994
INVENTOR(S) : CHILDRESS et al.

It is certified that error appears in the above-identified patent and that said letters patent is hereby corrected as shown below:

Column 38, lines 48 and 50, delete "plane" and insert therefor -- plan -- .

Column 41, line 31, delete "p1".

Signed and Sealed this

Second Day of July, 1996

Attest:

BRUCE LEHMAN

Attesting Officer     *Commissioner of Patents and Trademarks*